(12) United States Patent
Pettersson et al.

(10) Patent No.: US 10,542,288 B2
(45) Date of Patent: Jan. 21, 2020

(54) RANDOM ACCESS IN A VIDEO BITSTREAM

(71) Applicant: Telefonaktiebolaget L M Ericsson (publ), Stockholm (SE)

(72) Inventors: Martin Pettersson, Vallentuna (SE); Jonatan Samuelsson, Stockholm (SE); Rickard Sjöberg, Stockholm (SE); Jacob Ström, Stockholm (SE); Ruoyang Yu, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 755 days.

(21) Appl. No.: 14/646,722

(22) PCT Filed: Apr. 13, 2015

(86) PCT No.: PCT/EP2015/057975
§ 371 (c)(1),
(2) Date: May 21, 2015

(87) PCT Pub. No.: WO2015/192991
PCT Pub. Date: Dec. 23, 2015

(65) Prior Publication Data
US 2016/0219306 A1    Jul. 28, 2016

Related U.S. Application Data

(60) Provisional application No. 62/013,630, filed on Jun. 18, 2014.

(51) Int. Cl.
*H04N 19/70* (2014.01)
*H04N 19/107* (2014.01)
(Continued)

(52) U.S. Cl.
CPC .......... *H04N 19/70* (2014.11); *H04N 19/107* (2014.11); *H04N 19/132* (2014.11);
(Continued)

(58) Field of Classification Search
CPC ...... H04N 19/176; H04N 19/31; H04N 19/44; H04N 19/58; H04N 19/593; H04N 19/70; H04N 21/6379; H04N 21/8455
(Continued)

(56) References Cited

U.S. PATENT DOCUMENTS 6,115,420 A * 9/2000 Wang ................... H04N 19/147
375/240.03
9,674,532 B2 * 6/2017 Kim ....................... H04N 19/70
(Continued)

FOREIGN PATENT DOCUMENTS

JP     2014-57338 A     3/2014
WO    WO 02/37859 A2    5/2002
(Continued)

OTHER PUBLICATIONS

Taiwanese Office Action (Foreign text only), Application No. 104116301, dated Apr. 29, 2016.
(Continued)

*Primary Examiner* — Deirdre L Beasley
(74) *Attorney, Agent, or Firm* — Sage Patent Group

(57) ABSTRACT

The present embodiments introduce a new type of random access point in video bitstreams that can be used for random access operations but can be represented in encoded form at a lower bit-cost as compared to IRAP pictures. The random access point is a dependent random access point (DRAP) picture that is encoded and decoded using an IRAP picture as sole reference picture for the DRAP picture. The DRAP picture is encoded as a trailing picture that may be used for reference and constitutes a random access point in a video bitstream.

40 Claims, 11 Drawing Sheets

(51) Int. Cl.

| | |
|---|---|
| *H04N 19/132* | (2014.01) |
| *H04N 19/164* | (2014.01) |
| *H04N 19/176* | (2014.01) |
| *H04N 19/31* | (2014.01) |
| *H04N 19/44* | (2014.01) |
| *H04N 19/58* | (2014.01) |
| *H04N 19/593* | (2014.01) |
| *H04N 21/6379* | (2011.01) |
| *H04N 21/845* | (2011.01) |
| H04N 19/114 | (2014.01) |

(52) U.S. Cl.
CPC ......... *H04N 19/164* (2014.11); *H04N 19/176* (2014.11); *H04N 19/31* (2014.11); *H04N 19/44* (2014.11); *H04N 19/58* (2014.11); *H04N 19/593* (2014.11); *H04N 21/6379* (2013.01); *H04N 21/8455* (2013.01); *H04N 19/114* (2014.11)

(58) Field of Classification Search
USPC .................................................. 375/240.16
See application file for complete search history.

(56) References Cited

U.S. PATENT DOCUMENTS

| | | | | |
|---|---|---|---|---|
| 9,706,227 | B2* | 7/2017 | Chen | H04N 19/503 |
| 9,848,162 | B2* | 12/2017 | Ryu | G11B 27/105 |
| 2003/0185303 | A1* | 10/2003 | Hall | H04N 19/503 |
| | | | | 375/240.16 |
| 2004/0231004 | A1* | 11/2004 | Seo | H04N 7/17318 |
| | | | | 725/142 |
| 2007/0071405 | A1* | 3/2007 | Choi | G11B 27/10 |
| | | | | 386/239 |
| 2008/0037656 | A1* | 2/2008 | Hannuksela | H04N 21/23614 |
| | | | | 375/240.26 |
| 2008/0216116 | A1* | 9/2008 | Pekonen | H04N 21/23614 |
| | | | | 725/39 |
| 2009/0232469 | A1* | 9/2009 | Priddle | H04N 21/23412 |
| | | | | 386/278 |
| 2010/0177776 | A1* | 7/2010 | Crinon | H04L 12/6418 |
| | | | | 370/394 |
| 2010/0232520 | A1* | 9/2010 | Wu | H04N 21/2362 |
| | | | | 375/240.26 |
| 2012/0072948 | A1* | 3/2012 | Yang | H04L 47/15 |
| | | | | 725/32 |
| 2012/0230433 | A1* | 9/2012 | Chen | H04N 19/503 |
| | | | | 375/240.25 |
| 2013/0077681 | A1* | 3/2013 | Chen | H04N 19/105 |
| | | | | 375/240.12 |
| 2013/0308926 | A1* | 11/2013 | Jang | H04N 5/783 |
| | | | | 386/344 |
| 2014/0003537 | A1* | 1/2014 | Ramasubramanian | H04N 19/70 |
| | | | | 375/240.25 |
| 2014/0211849 | A1* | 7/2014 | Deshpande | H04N 19/105 |
| | | | | 375/240.12 |
| 2014/0301437 | A1* | 10/2014 | Wang | H04N 19/70 |
| | | | | 375/240.02 |
| 2014/0334546 | A1* | 11/2014 | Shibahara | H04N 19/159 |
| | | | | 375/240.16 |
| 2014/0355692 | A1* | 12/2014 | Ramasubramanian | H04N 19/597 |
| | | | | 375/240.26 |
| 2015/0103888 | A1* | 4/2015 | Chen | H04N 21/4343 |
| | | | | 375/240.02 |
| 2015/0195555 | A1* | 7/2015 | Hendry | H04N 19/46 |
| | | | | 375/240.16 |
| 2015/0215632 | A1* | 7/2015 | Choi | H04N 19/30 |
| | | | | 375/240.16 |
| 2015/0264370 | A1* | 9/2015 | Ramasubramanian | H04N 19/33 |
| | | | | 375/240.02 |
| 2015/0288970 | A1* | 10/2015 | Park | H04N 19/105 |
| | | | | 375/240.13 |
| 2015/0358629 | A1* | 12/2015 | Choi | H04N 19/70 |
| | | | | 375/240.02 |
| 2016/0006976 | A1 | 1/2016 | Ryu et al. | |
| 2016/0080747 | A1* | 3/2016 | Choi | H04N 19/70 |
| | | | | 375/240.12 |
| 2016/0112709 | A1* | 4/2016 | Tsukagoshi | H04N 19/70 |
| | | | | 375/240.12 |
| 2016/0191926 | A1* | 6/2016 | Deshpande | H04N 19/597 |
| | | | | 375/240.12 |
| 2016/0219306 | A1* | 7/2016 | Pettersson | H04N 19/176 |
| 2016/0227232 | A1* | 8/2016 | Choi | H04N 19/105 |
| 2016/0255373 | A1* | 9/2016 | Deshpande | H04N 19/70 |
| | | | | 375/240.25 |
| 2016/0316211 | A1* | 10/2016 | Sychev | H04N 19/50 |

FOREIGN PATENT DOCUMENTS

| | | | |
|---|---|---|---|
| WO | WO 2013/044075 A2 | 3/2013 | |
| WO | WO 2014/003379 A1 | 1/2014 | |

OTHER PUBLICATIONS

Taiwanese Office Action (Foreign text only), Application No. 104116300, dated Apr. 29, 2016.

International Search Report, International Application No. PCT/EP2015/057974, dated Jul. 3, 2015.

Written Opinion of the International Searching Authority, International Application No. PCT/EP2015/057974, dated Jul. 3, 2015.

International Search Report, Application No. PCT/EP2015/057973, dated Jul. 6, 2015.

Written Opinion of the International Searching Authority, Application No. PCT/EP2015/057973, dated Jul. 6, 2015.

Chen Jianle et al. "High efficiency video coding (HEVC) scalable extension draft 3", Joint Collaborative Team on Video Coding (JCT-VC) of ITU-TSG16 WP3 and ISO/IEC JTC1/SC29/WG11, $14^{th}$ Meeting: Vienna, AT, Jul. 25, 2013-Aug. 2, 2013.

Miao Dan et al: "High frame rate screen video coding for screen sharing applications", *2014 IEEE International Symposium on Circuits and Systems (ISCAS)*, IEEE, Jun. 1, 2014, pp. 2157-2160, XP032624507, DOI: 10.1109/ISCAS.2014.6865595.

Sjöberg et al.: "HLS: Dependent RAP indication SEI message", 19. JCT-VC Meeting; Oct. 17, 2014-Oct. 24, 2014; Strasbourg; (Joint Collaborative Team on Video Coding of ISO/IEC JTC1/SC29/WG11 and ITU-T SG.16); URL: http://wftp3.itu.int/av-arch/jctvc-site/,, No. JCTVC-S0095, Oct. 8, 2014, XP030116302.

Samuelsson et al.: "Restrictions on leading pictures of CRA and BLA", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J0251, Jul. 3, 2012, XP030112613.

Sullivan (Microsoft): "CRA pictures with broken links", 100. MPEG Meeting; Apr. 30, 2012-May 4, 2012; Geneva; (Motion Picture Expert Group or ISO/IEC JTC1/SC29/WG11),, No. m24653, Jun. 7, 2012, XP030052996.

Y-K Wang et al: "On bitstreams starting with CRA pictures", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-H0496, Jan. 21, 2012, XP030111523.

International Search Report, Application No. PCT/EP2015/057975, dated Sep. 25, 2015.

Written Opinion of the International Searching Authority, Application No. PCT/EP2015/057975, dated Sep. 25, 2015.

Boyce et al., "Output flag location", Document: JCTVC-L0179, Joint Collaborative Team on Video Coding (JCT-VC) of ITU-T SG16 WP3 and ISO/IEC JTC1/SC29/WG11; $12^{th}$ Meeting: Geneva, CH, Jan. 14-23, 2013, 6 pp.

Fujibayashi et al., "Random access support for HEVC", Document: JCTVC-D234 / WG11 No. m18994, Joint Collaborative Team on

(56) References Cited

OTHER PUBLICATIONS

Video Coding (JCT-VC) of ITU-T SG16 WP3 and ISO/IEC JTC1/SC29/WG11, 4th Meeting: Daegu, KR, Jan. 20-28, 2011, 8 pp.

Hannuksela, "MV-HEVC/SHVC HLS: On TSA and STSA pictures", Document: JCTVC-Q0108, Joint Collaborative Team on Video Coding (JCT-VC) of ITU-T SG16 WP 3 and ISO/IEC JTC 1/SC 29/WG 11; 17 Meeting: Valencia, ES, Mar. 27-Apr. 4, 2014; and Document: JCT3V-H0036; Joint Collaborative Team on 3D Video Coding Extension of ITU-6 SG 16 WP 3 and ISO/IEC JTC 1/SC 29/WG 11; 8th Meeting: Valencia, ES, Mar. 29-Apr. 4, 2014, 8 pp.

Hendry et al., "Random Access Detection and Notification", Document: JCTVC-G159, Joint Collaborative Team on Video Coding (JCT-VC) of ITU-T SG16 WP3 and ISO/IEC JTC1/SC29/WG11; 7th Meeting: Geneva, CH, Nov. 21-30, 2011, 6 pp.

Karczewicz et al., "The SP- and SI-Frames Design for H.264/AVC", *IEEE Transactions on Circuits and Systems for Video Technology,* vol. 13, No. 7, Jul. 2003, pp. 637-644.

Kazui et al., "Modification of recovery point SEI message", Document: JCTVC-I0044, Joint Collaborative Team on Video Coding (JCT-VC) of ITU-T SG 16 WP3 and ISO/IEC JTC 1/SC 29/WG 11, 9th Meeting: Geneva, CH, Apr. 27-May 7, 2012, 2 pp.

Liang et al., "Low-Latency Streaming of Pre-Encoded Video Using Channel-Adaptive Bitstream Assembly", *IEEE International Conference on Multimedia and Expo,* Aug. 26, 2002, pp. 873-876.

Pettersson et al., "HLS: Dependent RAP indication SEI message", Document: JCTVC-R0059, Joint Collaborative Team on Video Coding (JCT-VC) of ITU-T SG 16 WP 3 and ISO/IEC JTC 1/SC 29/WG 11; 18th Meeting: Sapporo, JP, Jun. 30-Jul. 9, 2014, 5 pp.

Sjöberg et al., "RExt HLS: Picture references across CRA pictures", Document: JCTVC-Q0116_v2, Joint Collaborative Team on Video Coding (JCT-VC) of ITU-T SG16 WP3 and ISO/IEC JTC 1/SC 29/WG11; 17th Meeting: Valencia, ES, Mar. 27-Apr. 4, 2014, 4 pp.

Wang et al., "POC Recovery in Random Access Point SEI Message", Document: JVT-F050 / Filename: JVT-F050.doc, Joint Video Team (JVT) of ISO/IEC MPEG & ITU-T VCEG (ISO/IEC JTC1/SC29/WG11 and ITU-T SG16 Q.6), 6th Meeting: Awaji, Island, JP, Dec. 5-13, 2002, 5 pp.

Office Action, TW Application No. 104116308, dated Aug. 10, 2016.

Patent Abstracts of Japan, JP 2007-184909A, published Jul. 19, 2007, Canon Inc., 1 page.

Patent Abstracts of Japan, JP 2007-306160A, published Nov. 22, 2007, Canon Inc., 1 page.

Japanese Office Action dated Dec. 22, 2017 (US Translation), Application No. JP2016-568609, 3 pages.

Final Rejection dated Apr. 27, 2018, Japanese Patent Application No. 2016-568609 (Japanese Language document) 3 pages.

Summary of Final Rejection dated Apr. 27, 2018, Japanese Patent Application No. 2016-568609 (English Language document) 2 pages.

* cited by examiner

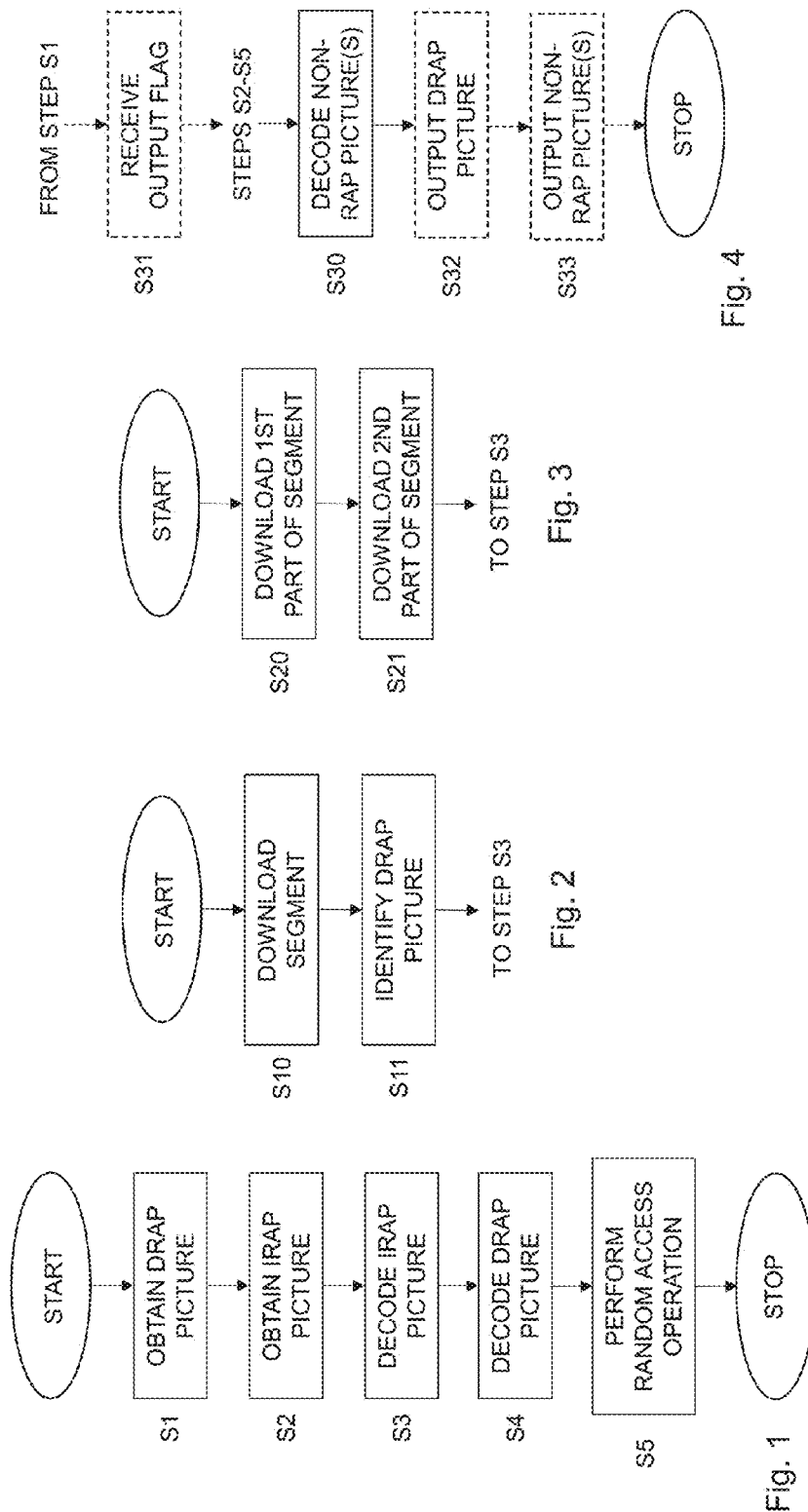

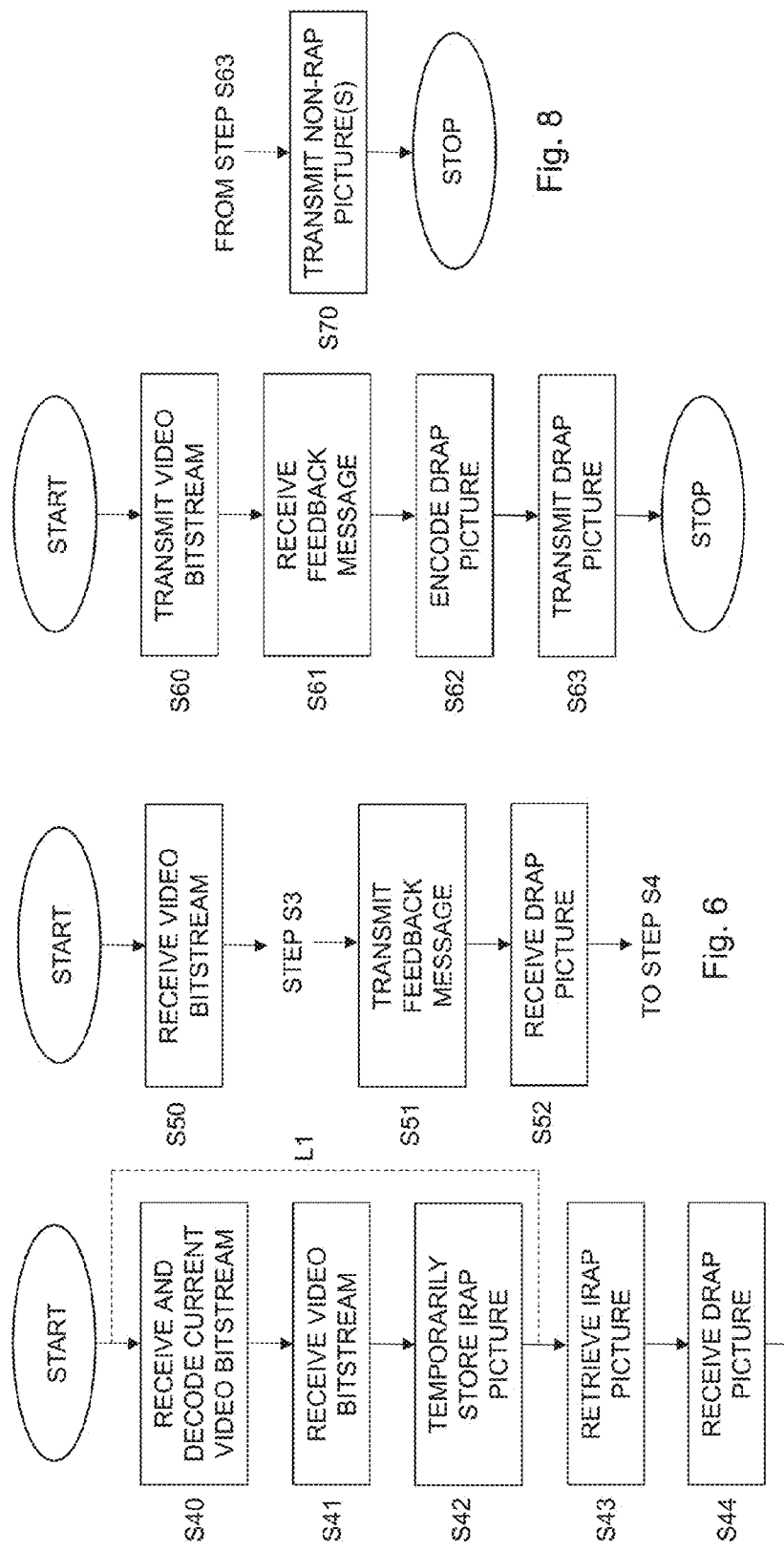

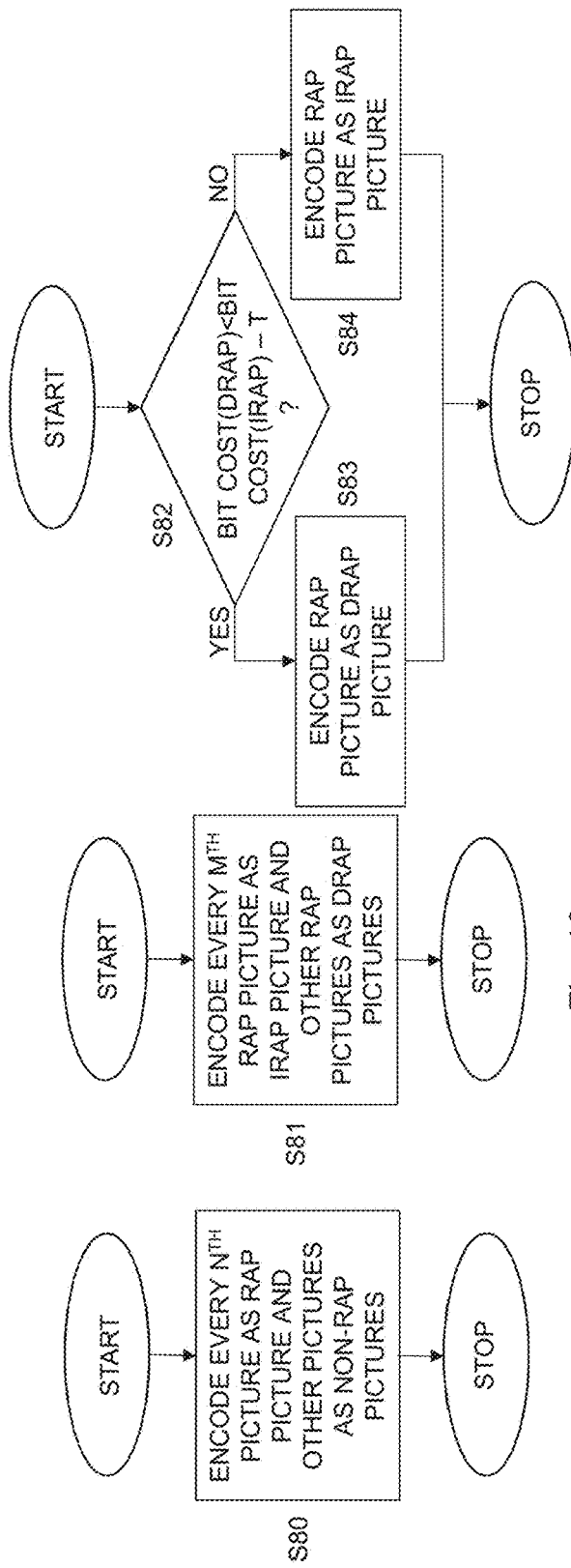

RANDOM ACCESS IN A VIDEO BITSTREAM

CROSS REFERENCE TO RELATED APPLICATION

This application is a 35 U.S.C. § 371 national stage application of PCT International Application No. PCT/EP2015/057975, filed on 13 Apr. 2015, which itself claims priority to U.S. provisional Patent Application No. 62/013,630, filed 18 Jun. 2014, the disclosure and content of both of which are incorporated by reference herein in their entirety.

TECHNICAL FIELD

The present embodiments generally relate to video processing, and in particular to random access operations in a video bitstream.

BACKGROUND

The amount of video data sent over internet, broadcasted networks and mobile networks are increasing for every year. This trend is pushed by the increased usage of over-the-top (OTT) services like Netflix, Hulu and YouTube as well as an increased demand for high quality video and a more flexible way of watching TV and other video services.

To keep up with the increasing bitrate demand for video it is important to have good video compression. Recently, JCT-VC in collaboration with MPEG developed the high efficiency video coding (HEVC) version 1 video codec which efficiently cuts the bitrate in half for the same quality compared to its predecessor AVC/H.264.

HEVC, also referred to as H.265, is a block based video codec that utilizes both temporal and spatial prediction. Spatial prediction is achieved using intra (I) prediction from within the current picture. A picture consisting of only intra coded blocks is referred to as an I-picture. Temporal prediction is achieved using inter prediction (P), also referred to as uni-predictive prediction, or bi-directional inter prediction (B), also referred to as bi-predictive prediction, on block level. In inter prediction a prediction is made from a single previously decoded picture. In bi-directional inter prediction the prediction is made from a combination of two predictions that may either reference the same previously decoded picture or two different previously decoded pictures. The previously decoded picture(s) is(are) decoded before the current picture and may come before or after the current picture in display time (output order). A picture containing at least one inter coded block but no bi-directional coded inter blocks is referred to as a P-picture. A picture containing at least one bi-directional inter block is referred to as a B-picture. Both P-pictures and B-pictures may also contain intra coded blocks. For a typical block, intra coding is generally much more expensive in bit cost compared to inter coding, which is generally more expensive than bi-predictive coding.

An instantaneous decoding refresh (IDR) picture is an I-picture for which a following picture may not reference a picture prior to the IDR picture. A clean random access (CRA) picture is an I-picture that allows a random access skipped leading (RASL) picture to reference a picture that follow the CRA picture in decoding order and precedes the CRA picture in display or output order. In case the decoding starts at the CRA picture, the RASL pictures must be dropped since they are allowed to predict from pictures preceding the CRA picture that may not be made available for prediction when the CRA picture is used for random access. Broken link access (BLA) pictures are I-pictures that are used for indicating splicing points in the bitstream. Bitstream splicing operations can be performed by changing the picture type of a CRA picture in a first bitstream to a BLA picture and concatenating the stream at a proper position in the other bitstream.

An intra random access point (IRAP) picture may be any one of IDR, CRA or BLA picture. All IRAP pictures guarantees that pictures that follow the IRAP in both decoding and output order do not reference any picture prior to the IRAP picture in decoding order. The first picture of a bitstream must be an IRAP picture, but there may be many other IRAP pictures throughout the bitstream. IRAP pictures provide the possibility to tune in to a video bitstream, for example when starting to watch TV or switching from one TV channel to another. IRAP pictures can also be used for seeking in a video clip, for example by moving the play position using the control bar of a video player, and dynamic streaming services. Moreover, an IRAP picture provides a refresh of the video in case there are errors or losses in the video bitstream and thereby improves the error robustness of a video bitstream.

Digital TV exists in three forms, terrestrial, satellite and cable, which are generally referred to as broadcasting services and one form, Internet Protocol Television (IPTV), which is generally referred to as multicast service. In all of these services a receiver receives the video bitstream of one TV channel, which is then decoded and the decoded video is displayed to the end user. It is common that the receiver additionally is capable of receiving video bitstreams of one or more additional channels that are received in order to provide the user with the ability to watch that channel/program later.

In adaptive streaming services the bitrate that is received by the receiver is adjusted to match the capabilities of the network. In dynamic adaptive streaming over hypertext transfer protocol (HTTP) (DASH), HTTP live streaming (HLS) and smooth streaming the user client selects bitrate over a chunk or segment, typically representing 10 seconds of video out of a set of different representations provided by a server.

In video conferencing and video telephony services there is a two-way communication between user clients. It is possible to use feedback messages to indicate packet losses or corruption in decoded pictures. Reference Picture Selection Indication (RPSI) is a feedback message that makes it possible for a receiver to indicate that an old picture should be used for reference because one or more recently transmitted pictures might not have been able to be decoded. By using an old picture that was correctly received and decoded, such as the previous IRAP picture, for reference, the encoder does not have to send a new intra picture. However, after having sent a feedback message, such as RPSI, the receiver will not know exactly when the sender has acknowledged the message and used only the selected reference picture for reference.

In broadcast and multicast services there is a desire to keep the channel switching time as short as possible. However, in order to switch to another channel there needs to be a random access point (RAP) in the video bitstream of the another channel. However, using IRAP pictures as RAPs makes the video bitstream more expensive to encode and will consequently increase the bitrate substantially compared to a video bitstream without intra pictures.

In adaptive streaming, in order to switch from one representation to another there needs to be an access point in the representation to which the user client chooses to switch. This is today typically realized with IRAP pictures. IRAP pictures are also used when a user selects to jump to a different position in the video bitstream. These IRAP pictures increase the bitrate substantially compared to a video bitstream without IRAP pictures.

SUMMARY

It is a general objective to provide an efficient video processing.

It is a particular objective to enable efficient random access operations in a video bitstream.

These and other objectives are met by embodiments disclosed herein.

An aspect of the embodiments relates to a method for performing a random access operation in a video bitstream. The method comprises obtaining a dependent random access point (DRAP) picture. The DRAP picture is encoded as a trailing picture that may be used for reference and constitutes a random access point in the video bitstream. The method also comprises obtaining an intra random access point (IRAP) picture of the video bitstream. The method further comprises decoding the IRAP picture and decoding the DRAP picture using the IRAP picture as sole reference picture for the DRAP picture. The method additionally comprises performing a random access operation at the decoded DRAP picture.

A related aspect of the embodiments defines a user client configured to obtain a DRAP picture. The DRAP picture is encoded as a trailing picture that may be used for reference and constitutes a random access point in the video bitstream. The user client is also configured to obtain an IRAP picture of the video bitstream. The user client is further configured to decode the IRAP picture and decode the DRAP picture using the IRAP picture as sole reference picture for the DRAP picture. The user client is additionally configured to perform a random access operation at the decoded DRAP picture.

Another related aspect of the embodiments defines a user client comprising a picture provider for obtaining a DRAP picture and an IRAP picture. The DRAP picture is encoded as a trailing picture that may be used for reference and constitutes a random access point in the video bitstream. The user client also comprises a decoder for decoding the IRAP picture and decoding the DRAP picture using the IRAP picture as sole reference picture for the DRAP picture. The user client further comprises a random access unit for performing a random access operation at the decoded DRAP picture.

Another aspect of the embodiments defines a video communication method comprising transmitting a video bitstream comprising at least one IRAP picture on a communication channel to a user client. The method also comprises receiving a feedback message on a feedback channel from the user client. The feedback message indicates a position within the video bitstream corresponding to a corrupt or missing picture at the user client. The method further comprises encoding, based on the feedback message, a DRAP picture using a previous IRAP picture in the video bitstream as sole reference picture for the DRAP picture. The DRAP picture is encoded as a trailing picture that may be used for reference and constitutes a random access point in the video bitstream. The method additionally comprises transmitting the DRAP picture to the user client.

A related aspect of the embodiments defines a video communication server configured to transmit a video bitstream comprising at least one IRAP picture on a communication channel to a user client. The video communication server is also configured to receive a feedback message on a feedback channel from the user client. The feedback message indicates a position within the video bitstream corresponding to a corrupt or missing picture at the user client. The video communication server is further configured to encode, based on the feedback message, a DRAP picture using a previous IRAP picture in the video bitstream as sole reference picture for the DRAP picture. The DRAP picture is encoded as a trailing picture that may be used for reference and constitutes a random access point in the video bitstream. The video communication server is additionally configured to transmit the DRAP picture to the user client.

Another related aspect of the embodiments defines a video communication system comprising a transmitter for transmitting a video bitstream comprising at least one IRAP picture on a communication channel to a user client. The video communication server also comprises a receiver for receiving a feedback message on a feedback channel from the user client. The feedback message indicates a position within the video bitstream corresponding to a corrupt or missing picture at the user client. The video communication server further comprises an encoder for encoding, based on the feedback message, a DRAP picture using a previous IRAP picture in the video bitstream as sole reference picture for the DRAP picture. The DRAP picture is encoded as a trailing picture that may be used for reference and constitutes a random access point in the video bitstream. The transmitter is also for transmitting the DRAP picture to the user client.

A further aspect of the embodiments relates to a method for encoding a video stream of pictures into a video bitstream. The method comprises encoding every $n^{th}$ picture in the video stream as a RAP picture and encoding the other pictures in the video stream as non-RAP pictures. The encoding of every $n^{th}$ picture comprises encoding the every $n^{th}$ picture by encoding every $m^{th}$ RAP picture as an IRAP picture and encoding the other RAP pictures as DRAP pictures using a respective closest preceding, according to a decoding order, IRAP picture as sole reference picture for the DRAP picture. Each DRAP picture is encoded as a trailing picture and constitutes a random access point in the video bitstream.

Yet another aspect of the embodiments relates to a method for encoding a video stream of pictures into a video bitstream. The method comprises encoding every $n^{th}$ picture in the video stream as a RAP picture and encoding the other pictures in the video stream as non-RAP pictures. The encoding of every $n^{th}$ picture comprises encoding every $n^{th}$ picture by determining, for at least a subset of the RAP pictures, whether the RAP picture is to be encoded as an IRAP picture or a DRAP picture based on a bit-cost difference between encoding the RAP picture as an IRAP picture or as a DRAP picture. A DRAP picture is encoded using a respective closest preceding, according to a decoding order, IRAP picture as sole reference picture for the DRAP picture. The DRAP picture is encoded as a trailing picture and constitutes a random access point in the video bitstream.

A related aspect of the embodiments defines to an encoder for encoding a video stream of pictures into a video bitstream. The encoder is configured to encode every $n^{th}$ picture in the video stream as a RAP picture and encode the other pictures in the video stream as non-RAP pictures. The encoder is also configured to encode the every $n^{th}$ picture by encoding every $m^{th}$ RAP picture as an IRAP picture and encoding the other RAP pictures as DRAP pictures using a respective closest preceding, according to a decoding order, IRAP picture as sole reference picture for the DRAP picture. Each DRAP picture is encoded as a trailing picture and constitutes a random access point in the video bitstream.

Another related aspect of the embodiments defines an encoder for encoding a video stream of pictures into a video bitstream. The encoder is configured to encode every $n^{th}$ picture in the video stream as a RAP picture and encode the other pictures in the video stream as non-RAP pictures. The encoder is also configured to encode every $n^{th}$ picture by determining, for at least a subset of the RAP pictures, whether the RAP picture is to be encoded as an IRAP picture or a DRAP picture based on a bit-cost difference between encoding the RAP picture as an IRAP picture or as a DRAP picture. A DRAP picture is encoded by the encoder using a respective closest preceding, according to a decoding order, IRAP picture as sole reference picture for the DRAP picture. The DRAP picture is encoded as a trailing picture and constitutes a random access point in the video bitstream.

Yet another aspect of the embodiments relates to a computer program comprising instructions, which when executed by a processor, cause the processor to obtain a DRAP picture that is encoded as a trailing picture that may be used for reference and constitutes a random access point in the video bitstream. The processor is also caused to obtain an IRAP picture of the video bitstream. The processor is further caused to decode the IRAP picture, and decode the DRAP picture using the IRAP picture as sole reference picture for the DRAP picture. The processor is additionally caused to perform a random access operation at the decoded DRAP picture.

A further aspect of the embodiments relates to a computer program comprising instructions, which when executed by a processor, cause the processor to transmit a video bitstream comprising at least one IRAP picture on a communication channel to a user client. The processor is also caused to receive a feedback message on a feedback channel from the user client. The feedback message indicates a position within the video bitstream corresponding to a corrupt or missing picture at the user client. The processor is further caused to encode, based on the feedback message, a DRAP picture using a previous IRAP picture in the video bitstream as sole reference picture for the DRAP picture. The DRAP picture is encoded as a trailing picture that may be used for reference and constitutes a random access point in the video bitstream. The processor is additionally caused to transmit the DRAP picture to the user client.

Yet another aspect of the embodiments relates to a computer program comprising instructions, which when executed by a processor, cause the processor to encode every $n^{th}$ picture in the video stream as a RAP picture and encode the other pictures in the video stream as non-RAP pictures. The processor is also caused to encode the every $n^{th}$ picture by encoding every $m^{th}$ RAP picture as an IRAP picture and encoding the other RAP pictures as DRAP pictures using a respective closest preceding, according to a decoding order, IRAP picture as sole reference picture for the DRAP picture. Each DRAP picture is encoded as a trailing picture and constitutes a random access point in the video bitstream.

A further aspect of the embodiments relates to a computer program comprising instructions, which when executed by a processor, cause the processor to encode every $n^{th}$ picture in the video stream as a RAP picture and encode the other pictures in the video stream as non-RAP pictures. The processor is also caused to encode every $n^{th}$ picture by determining, for at least a subset of the RAP pictures, whether the RAP picture is to be encoded as an IRAP picture or a DRAP picture based on a bit-cost difference between encoding the RAP picture as an IRAP picture or as a DRAP picture. A DRAP picture is encoded by the encoder using a respective closest preceding, according to a decoding order, IRAP picture as sole reference picture for the DRAP picture. The DRAP picture is encoded as a trailing picture and constitutes a random access point in the video bitstream.

A related aspect of the embodiments defines a carrier comprising a computer program according to the embodiments above. The carrier is one of an electronic signal, an optical signal, an electromagnetic signal, a magnetic signal, an electric signal, a radio signal, a microwave signal, or a computer-readable storage medium.

The present embodiments provide a new type of RAP pictures in a video bitstream that can be used to perform a random access operation. Such a RAP picture is a DRAP picture implying that it is encoded and decoded using a previous IRAP picture as sole reference picture. As a consequence, the DRAP picture can be represented at a significant lower bit cost as compared to IRAP pictures but still constitutes a RAP in a video bitstream and can thereby be used to perform random access operations within the video bitstream.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method for performing a random access operation according to an embodiment;

FIG. 2 is a flow chart illustrating an embodiment of the obtaining steps in FIG. 1;

FIG. 3 is a flow chart illustrating another embodiment of the obtaining steps in FIG. 1;

FIG. 4 is a flow chart illustrating additional, optional steps of the method shown in FIG. 1;

FIG. 5 is a flow chart illustrating a further embodiment of the obtaining steps in FIG. 1;

FIG. 6 is a flow chart illustrating yet another embodiment of the obtaining steps in FIG. 1;

FIG. 7 is a flow chart illustrating a video communication method according to an embodiment;

FIG. 8 is a flow chart illustrating an additional, optional step of the method shown in FIG. 7;

FIG. 9 is a flow chart illustrating a method for encoding a video stream according to an embodiment;

FIG. 10 is a flow chart illustrating an embodiment of the encoding step in FIG. 9;

FIG. 11 is a flow chart illustrating another embodiment of the encoding step in FIG. 9;

DETAILED DESCRIPTION

Figure 12:
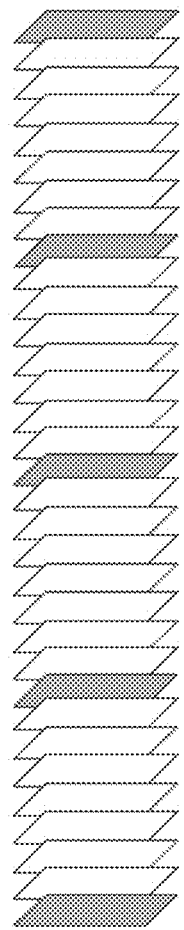
FIG. 12 schematically illustrates a video bitstream with random access configuration using the current HEVC specification.

Throughout the drawings, the same reference numbers are used for similar or corresponding elements.

The present embodiments generally relate to video processing, and in particular to random access operations in a video bitstream.

The embodiments introduce a new concept with regard to random access points (RAP) within video coding and decoding. The RAP pictures of the embodiments differ from IRAP pictures that are traditionally used as RAP points in a video bitstream. An IRAP picture is independently decodable, i.e. does not use any reference pictures. The RAPs of the embodiments are dependent RAPs in the form of dependent random access point (DRAP) pictures. Hence, a DRAP picture of the embodiments is not independently decodable, i.e. a DRAP picture uses at least one reference picture, but still constitutes a RAP within a video bitstream. A DRAP picture can be encoded and represented using significantly fewer bits as compared to an IRAP picture. Hence, DRAP pictures of the embodiments may be used to reduce the overall bit cost of a video bitstream or could be used to increase the total number of RAPs in a video bitstream without increasing the overall bit cost.

A DRAP picture differs from other non-IRAP picture in that a DRAP picture is much more restricted in what reference picture(s) it can use. These restrictions enables the DRAP picture to be used for random access operations. A random access operation is when decoding is started not from the beginning of the video bitstream. Instead decoding is started at some position within the video bitstream at a point identified as a random access point. Examples of random access operations include tuning into broadcasted TV streams, i.e. when starting to watch TV, or switching from one TV channel to another.

As a consequence, the DRAP pictures of the embodiments can be introduced into a video bitstream and used in order to perform random access operations but at a lower cost in terms of number of bits as compared to using IRAP pictures in order to enable random access.

FIG. 1 is a flow chart illustrating a method for performing a random access operation in a video bitstream according to an embodiment. The method starts in step S1, which comprises obtaining a DRAP picture. The DRAP picture is encoded as a trailing picture that may be used for reference and constitutes a random access point in the video bitstream. A next step S2 comprises obtaining an IRAP picture of the video bitstream. The IRAP picture is decoded in step S3 and the DRAP picture is decoded in step S4 using the IRAP picture as sole reference picture for the DRAP picture. A next step S5 comprises performing a random access operation at the decoded DRAP picture.

Steps S1 to S3 can be performed in any order as long as step S2 is performed prior to step S3. For instance, steps S1 and S2 can be performed serially in any order (step S1 prior to step S2 or step S2 prior to step S1) or at least partly in parallel. Correspondingly, step S1 may be performed prior to or following step S3 or at least partly in parallel with step S3.

The IRAP picture decoded in step S3 may be used as reference picture when decoding the DRAP picture in step S4 and is thereby a preceding IRAP picture in the video bitstream according to the decoding order. The IRAP picture is decoded independently, i.e. without any reference pictures.

The DRAP picture decoded in step S4, in clear contrast to the IRAP picture, has at least one reference picture. This at least one reference picture is preferably the IRAP picture as decoded in step S3.

In an embodiment, step S4 comprises decoding the DRAP picture using only a closest preceding, according to the decoding order, IRAP picture in the video bitstream as the sole reference picture for the DRAP picture. In this embodiment, the DRAP picture can only reference the closest preceding IRAP picture in the video bitstream according to the decoding order and only use this particular IRAP picture as reference picture when decoding the blocks of the DRAP picture in step S4.

The DRAP picture may be encoded as a temporal predictive picture having a single reference indication to the closest preceding IRAP picture. This means that the DRAP picture could be regarded as a P-picture but with the important difference that it constitutes a RAP in the video bitstream whereas a P-picture cannot constitute such a RAP. In another example, the DRAP picture could be regarded as a B-picture. In such a case, it may contain blocks that use two references to the same closest preceding IRAP picture instead of only one reference to the closest preceding IRAP picture.

The DRAP picture is a temporal predictive picture, such as P-picture, that may only reference a previous RAP picture. The previous RAP picture may, in an embodiment, be a picture that corresponds to an encoded representation of a picture earlier in the video bitstream. Alternatively, the previous RAP picture may be a picture that is not output but only constitutes a god reference for the pictures in the video bitstream, e.g. representing the background of a scene.

The DRAP picture is encoded as a trailing picture that may be used for reference. A trailing picture is a picture that follows an associated RAP picture in output order. The associated RAP picture is the closest preceding RAP picture in decoding order. In HEVC, the DRAP picture is a so-called TRAIL_R picture. TRAIL_R is defined as a trailing picture that may be used for reference. Hence, pictures following the DRAP picture in decoding order in the video bitstream may reference the DRAP picture and use the DRAP picture as reference picture during decoding.

Thus, a trailing picture is a picture that is not marked as an IRAP picture and is not a leading picture to an IRAP picture. It follows the IRAP picture in decoding order and is, thus, a trailing picture of an IRAP picture. In the HEVC standard, a trailing picture also follows the IRAP picture in output order.

A TRAIL_R picture is in HEVC indicated by a network abstraction layer (NAL) type value of 1. Hence, in an embodiment the DRAP picture comprises a NAL type value of 1 in a NAL unit header of the NAL unit comprising the encoded video data of the DRAP picture.

In a particular embodiment, the DRAP picture is encoded as a trailing picture that may be used for reference and belongs to a lowest layer of the video bitstream. Hence, in this embodiment the DRAP picture has a value of the temporal identifier parameter (temporal id or TemporalId) equal to 0. Temporal id of 0 means that the DRAP picture belongs to the lowest layer and can be used as reference by other pictures in the video bitstream regardless of their temporal id.

The DRAP picture may be signaled as a DRAP picture in the video bitstream according to various embodiments.

In an embodiment, the DRAP picture is identified as a DRAP picture based on a picture type identifier associated with the DRAP picture and included in a NAL unit header of the video bitstream.

Hence, in this embodiment at least one value of the NAL unit type is dedicated to signal DRAP pictures. This means that the NAL unit carrying encoded video data of a DRAP picture has the value of the NAL unit type parameter in its NAL unit header set to the value dedicated for DRAP pictures. As a non-limiting example a NAL unit type=24 could be used to signal DRAP pictures.

In another embodiment, step S1 of FIG. 1 comprises identifying the DRAP picture as a DRAP picture based on a supplemental enhancement information (SEI) message associated with the DRAP picture. The method then continues to step S2 in FIG. 1.

In an example, the SEI message is sent together with the associated picture indicating that the picture is a DRAP picture and can thereby be used as RAP in the video bitstream. Hence, the placement of the SEI message in the video bitstream indicates which picture the SEI message belongs to.

If the DRAP picture is signaled using an SEI message it is not necessary to signal the DRAP picture as a specific picture type in the video bitstream as described in the embodiment above.

Thus, a new type of SEI message, indicated as dependent_rap_indication here below as an illustrative but non-limiting example, is used to signal which pictures in the video bitstream that are DRAP pictures.

In an embodiment, the SEI message may be empty and used to indicate to a decoder, a network element or any entity that operates on the video bitstream, that the picture associated with the SEI message is a DRAP picture.

The SEI message may then be in the form of:

|  | Descriptor |
|---|---|
| dependent_rap_indication( payloadSize ) {<br>} |  |

In other embodiments, the SEI message is not empty but may comprise additional information, which is further described below.

Another version of the SEI message could be structured like this:

|  | Descriptor |
|---|---|
| dependent_rap_indication( payloadSize ) {<br>   broken_link_flag<br>} | u(1) |

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use its associated IRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture for reference.

broken_link_flag indicates the presence or absence of a broken link in the NAL unit stream at the location of the dependent rap indication SEI message and is assigned further semantics as follows:

If broken_link_flag is equal to 1, pictures produced by starting the decoding process at the location of a previous IRAP access unit may contain undesirable visual artefacts to the extent that decoded pictures preceding the access unit associated with the dependent RAP indication should not be displayed.

Otherwise (broken_link_flag is equal to 0), no indication is given regarding any potential presence of visual artefacts.

Other versions of the SEI message could be structured like this:

|  | Descriptor |
|---|---|
| dependent_rap_indication( payloadSize ) {<br>   referenced_irap_picture_poc_delta_idc_minus1<br>} | ue(v) |
| dependent_rap_indication( payloadSize ) {<br>   broken_link_flag<br>   referenced_irap_picture_poc_delta_idc_minus1<br>} | u(1)<br>ue(v) |

In this example, step S1 of FIG. 1 comprises identifying the DRAP picture in the video bitstream at least partly based on an SEI message associated with the DRAP picture. The method also comprises retrieving a reference picture delta identifier from the SEI message. The method further comprises calculating a picture order count (POC) value of the IRAP picture based on a POC value of the DRAP picture and the reference picture delta identifier if the reference picture delta identifier is greater than zero. In this embodiment, step S2 of FIG. 1 comprises identifying the IRAP picture based on the calculated POC value if the reference picture delta identifier is greater than zero and identifying the RAP picture as a closest preceding IRAP picture in the video bitstream if the reference picture delta identifier is equal to zero.

In a particular embodiment, the method also comprises investigating a value of the reference picture delta identifier. If the value is different from zero the POC value of the IRAP picture used as reference picture for the DRAP picture is calculated, preferably equal to POC(IRAP)=POC(DRAP)−(reference_irap_picture_poc_delta_idc_minus1+1). The IRAP picture is then identified based on the calculated POC value.

However, if the investigation concludes that the value of the reference picture delta identifier is equal to zero the IRAP picture is identified as the closest preceding IRAP picture in the video bitstream. Hence, no calculation of POC values is needed in this case.

In these examples, the POC value of the IRAP picture would always be lower than the POC value of the DRAP picture since the IRAP precedes the DRAP picture in decoding and output order. This means that reference picture delta identifier will either be zero or be a positive integer.

The SEI message could include only the parameter reference picture delta identifier or reference picture delta identifier together with the broken link flag as indicated above.

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use its associated IRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture for reference.

broken_link_flag, if present, is defined as in the SEI example above.

referenced_irap_picture_poc_delta_idc_minus1 specifies the difference between the POC of the DRAP picture and the POC of the IRAP picture referenced by the DRAP picture minus 1.

In further versions of the embodiment the SEI message could be structured like this:

|  | Descriptor |
| --- | --- |
| dependent_rap_indication( payloadSize ) {  |  |
|    referenced_irap_picture_poc_delta_idc | ue(v) |
| } |  |
| dependent_rap_indication( payloadSize ) { |  |
|    broken_link_flag | u(1) |
|    referenced_irap_picture_poc_delta_idc | ue(v) |
| } |  |

These versions are similar to above but in this case, if the value of referenced_irap_picture_poc_delta_idc is greater than zero then the POC value of the IRAP picture is calculated as POC(IRAP)=POC(DRAP)−reference_irap_picture_poc_delta_idc.

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use its associated IRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture for reference.

broken_link_flag, if present, is defined as in the SEI example above.

referenced_irap_picture_poc_delta_idc, when greater than zero, specifies the difference between the POC of the DRAP picture and the POC of the IRAP picture referenced by the DRAP picture. When referenced_irap_picture_poc_delta_idc equals 0, the DRAP is using the previous IRAP picture for reference.

As seen, the reference to the IRAP picture can be specified in two different ways, either by explicit reference using delta idc or saying that the previous IRAP picture is used for reference. The reason for not always using explicit reference is that for some system applications where IRAPs and potentially DRAPs are signaled at the systems layer anyway, obtaining the POC value could be a bit cumbersome. Moreover, a few bits are saved by not explicitly signaling the reference.

Yet other version of the SEI message could be structured like this:

|  | Descriptor |
| --- | --- |
| dependent_rap_indication( payloadSize ) { |  |
|    referenced_irap_picture_poc_lsb | ue(v) |
| } |  |
| dependent_rap_indication( payloadSize ) { |  |
|    broken_link_flag | u(1) |
|    referenced_irap_picture_poc_lsb | ue(v) |
| } |  |

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use its associated IRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture for reference.

broken_link_flag, if present, is defined as in the SEI example above.

referenced_irap_picture_poc_lsb specifies the POC least significant bit (lsb) of the IRAP picture referenced by the DRAP picture.

The POC value of the IRAP picture is then calculated based on the parameter referenced_rap_picture_poc_lsb, thereby allowing identification of the IRAP picture that is used as reference picture for the DRAP picture.

More information of how to calculate the POC value of the IRAP picture based on the parameter referenced_rap_picture_poc_lsb can be found in section 8.3.2. Decoding process for reference picture set of ITU-T H.265 Series H: Audiovisual and multimedia systems, Infra structure of audiovisual services—Coding of moving video, High efficiency video coding.

Yet other version of the SEI message could be structured like this:

|  | Descriptor |
|---|---|
| dependent_rap_indication( payloadSize ) { |  |
|     implicitly_reference_previous_irap_picture_flag | u(1) |
|     if (!implicitly_reference_previous_irap_picture_flag) |  |
|         referenced_irap_picture_poc_delta_idc | ue(v) |
| } |  |
| dependent_rap_indication( payloadSize ) { |  |
|     broken_link_flag | u(1) |
|     implicitly_reference_previous_irap_picture_flag | u(1) |
|     if (!implicitly_reference_previous_irap_picture_flag) |  |
|         referenced_irap_picture_poc_delta_idc | ue(v) |
| } |  |

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use its associated IRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture for reference.

broken_link_flag, if present, is defined as in the SEI example above.

implicitly_reference_previous_irap_picture_flag indicates whether the previous IRAP picture is referenced by the DRAP picture associated with the dependent RAP indication SEI message according to:

If implicitly_reference_previous_irap_picture_flag equals 1 the DRAP picture is referencing the previous IRAP picture without explicitly referencing this IRAP picture in the dependent RAP indication SEI message.

Otherwise, if implicitly_reference_previous_irap_picture_flag equals 0 a reference indicator for the IRAP picture referenced by the DRAP picture is explicitly signaled in the dependent RAP indication SEI message.

referenced_irap_picture_poc_delta_idc is defined as in the SEI example above.

This example embodiment using the implicitly reference previous IRAP picture flag could alternatively be used together with the parameter referenced_irap_picture_poc_delta_idc_minus1 or referenced_irap_picture_poc_lsb instead of referenced_irap_picture_poc_delta_idc.

In an embodiment, step S2 of FIG. 1 comprises identifying the IRAP picture in a decoded picture buffer (DPB) based on an identifier of the IRAP picture present in a reference picture set (RPS) of the DRAP picture.

Thus, in this embodiment an identifier of the IRAP picture is preferably retrieved from the RPS of the DRAP picture. The RPS of the DRAP picture may signal the IRAP picture as a short-term reference picture or a long-term reference picture.

The method then continues to step S3, where the IRAP picture identified by the identifier retrieved from the RPS is decoded to thereby be used as reference picture for the DRAP picture. The DRAP picture is then decoded in step S4 with the IRAP picture decoded in step S3 as the sole reference picture.

In an alternative embodiment, the IRAP picture is decoded and stored in the DPB. Then the RPS of the DRAP picture is parsed in order to retrieve the identifier of the IRAP picture. This identifier thereby signals that the already decoded IRAP picture should be kept stored in the DPB as a short-term reference picture or a long-term reference picture and used as reference picture when decoding blocks of the DRAP picture. Hence, in this case, steps S2 and S3 are performed prior to steps S1 and S4.

Hence, in this embodiment, the IRAP picture is the sole reference picture and is thereby signaled in the RPS of the DRAP picture. The IRAP picture could be signaled as a so called short-term reference picture or a long-term reference picture depending on how long the decoded IRAP picture should be kept stored in the DPB.

In HEVC and other video coding standards using RPSs, using a picture as a reference picture corresponds to having an identifier in the so called Curr lists of the RPS, i.e. in RefPicSetStCurrBefore, RefPicSetStCurrAfter or RefPicSetLtCurr. This means that the DRAP picture preferably only has identifier(s) of the IRAP picture in the Curr lists of its RPS. Identifiers of other previous pictures that cannot be used as reference pictures when decoding the DRAP picture may still be present in the RPS, in the Foll lists of the RPS of the DRAP picture, i.e. in PocStFoll or PocLtFoll.

The DRAP picture decoded in step S4 constitutes, as mentioned above, a RAP in the video bitstream. Hence, the DRAP picture can be used as a RAP in the video bitstream and can be used to perform a random access operation in the video bitstream, i.e. it is possible to perform a random access operation at the DRAP picture. Please note that the IRAP picture decoded in step S3 is also a RAP in the video bitstream. The RAP provided by the IRAP picture is, however, an independent RAP implying that the IRAP picture can be decoded without reference to any other picture in the video bitstream. This is in clear contrast to the RAP provided by the DRAP picture, which is a dependent RAP implying that the DRAP picture references a previous IRAP picture in the video bitstream and is thereby decoded using such previous IRAP picture as the sole reference picture.

The DRAP picture constitutes a random access point in the video bitstream. This means that a random access operation may take place at the position in the video bitstream corresponding to the DRAP picture. The DRAP picture is, however, a dependent RAP picture. The DRAP picture is decoded with the IRAP picture as the sole reference picture for the DRAP picture. This means that in order to perform the random access operation also the IRAP picture needs to be decoded. However, any other pictures in-between the IRAP picture and the current DRAP picture do not need to be decoded in order to perform the random access operation. Hence, in a particular embodiment the DRAP picture together with the IRAP picture constitutes a random access point in the video bitstream.

FIG. 4 is a flow chart illustrating additional, optional steps of the method according to various embodiments. In an embodiment, the method continues from step S5 in FIG. 1. A next step S30 comprises decoding at least one non-RAP picture of the video bitstream following the DRAP picture in output order and decoding order. The at least one non-RAP picture does not use any non-RAP picture preceding the DRAP picture in decoding order in the video bitstream as reference picture.

Thus, the non-RAP pictures following the DRAP picture do not reference any picture preceding the DRAP picture in decoding order except for potentially the IRAP picture that is used as reference for the DRAP picture. This means that no non-RAP picture preceding the DRAP picture in decoding order is used as reference picture for any non-RAP pictures following the DRAP picture in output order and decoding order.

Hence, prediction across a DRAP picture is prohibited. Non-RAP pictures that follow the DRAP picture must not use any non-RAP picture that precedes the DRAP picture or any picture that precedes the IRAP picture associated with the DRAP picture for prediction. The IRAP picture that is associated with the DRAP picture the closest preceding IRAP picture in decoding order.

In a particular embodiment, pictures following the DRAP picture in output order and decoding order may not use any pictures preceding the DRAP picture in decoding order as reference picture with the exception that pictures following the DRAP picture in output and decoding order may use the IRAP picture associated with the DRAP picture as reference picture.

In another particular embodiment, pictures following the DRAP picture in output order and decoding order may not use any pictures preceding the DRAP picture in decoding order as reference picture with the exception that a following DRAP picture may use the IRAP picture as reference picture.

In a further particular embodiment, the pictures following the DRAP picture in output and decoding order may additionally not use any RAP pictures preceding, in decoding order, the IRAP picture associated with the DRAP picture, i.e. used as reference picture when decoding the DRAP picture.

This restriction in prediction across the DRAP picture enables efficient usage of the DRAP picture as RAP in the video bitstream. If prediction would have been allowed across the DRAP picture then non-RAP pictures following the DRAP picture in decoding and output order might not be correctly decoded in case the DRAP picture was used as RAP in a random access operation since any reference picture preceding the DRAP picture in decoding order might not be available in the DPB.

The following two steps S32 and S33 relate to output embodiments. Step S32 comprises outputting the decoded DRAP picture. The following step S33 comprises outputting the non-RAP picture(s).

The pictures output in steps S32 and S33 are output according to the output order, which may be different from the decoding order. In the random access operation, decoding starts (S3) with the IRAP picture and then continues with the DRAP picture (S4) that constitutes the RAP for the random access operation. Decoding then continues with the following non-RAP pictures (S30). The first picture that is output following the random access operation is preferably the DRAP picture (S32) and then the non-RAP pictures (S33) in output order.

Hence, in a preferred embodiment the IRAP picture used as reference picture for the DRAP picture is preferably not output. In HEVC, this could be signaled by setting an output flag of the IRAP picture to 0 to indicate that it should not be output. Alternatively, the decoder could infer the value of the output flag of pictures preceding the DRAP picture to be 0 to thereby prevent such preceding pictures from being output when conducting a random access operation at the DRAP picture. Other means of suppressing output of pictures could be used for non-HEVC video.

Hence, in a particular embodiment, the method continues from step S1 in FIG. 1 and a next step S31 comprises receiving an output flag associated with the IRAP picture. The output flag indicates that the IRAP picture should not be output.

Output of pictures in steps S32 and S33 typically involves output for display. However, output could alternatively mean output for other purposes than display. Non-limiting examples include output for transcoding, output for storage, output for video analysis, e.g. in surveillance applications, etc.

Here below various examples of random access operations and uses of the DRAP pictures of the embodiments will be presented.

A first example is suitable for, but not limited to, adaptive streaming, also referred to as adaptive bitrate streaming in the art. Adaptive streaming is almost exclusively based on HTTP and designed to work efficiently over large distributed HTTP networks, such as the Internet. Generally, adaptive streaming involves detecting the bandwidth and central processing unit (CPU) capacity of a user client in real time and adjusting the quality of a video bitstream accordingly. More specifically, adaptive streaming could refer to a method of video streaming over HTTP where the video content may be encoded at multiple bit rates, then each of the different bit rate video bitstreams are segmented into small multi-second parts, typically denoted segments or chunks in the art. When starting the streaming session, the user client usually requests the segments from the lowest bit rate video bitstream. If the user client finds the download speed greater than the bit rate of the segment downloaded, then it will request the next higher bit rate segments. Later, if the client finds the download speed for a segment lower than the bit rate for the segment, and therefore the network throughput has deteriorated, then it will request a lower bit rate segment. The segment size can vary depending on the particular implementation, but they are typically between two and ten seconds.

Adaptive streaming is currently available in the form of DASH, also referred to as MPEG-DASH, HLS, Microsoft Smooth Streaming, Adobe Dynamic Streaming for Flash, AuayStreams Adaptive Streaming, and high definition (HD) Adaptive Streaming by upLynk as illustrative but non-limiting examples.

FIG. 2 is a flow chart illustrating an embodiment of steps S1 and S2 in FIG. 1. The method starts in step S10, which comprises downloading a segment of encoded video data of the video bitstream. The segments starts with the IRAP picture and comprises at least one DRAP picture. A following step S11 comprises identifying the DRAP picture in the segment based on a jump forward or fast forward request. The method then continues to step S3 in FIG. 1.

The embodiment illustrated in FIG. 2 is thereby suitable for the trick play operations jump forward or fast forward within a segment of encoded video data as an example of random access operation.

In this embodiment, the encoded video data of the video bitstream is preferably partitioned or segmented into segments or chunks, which may, for instance, contain between two to ten seconds of video data. Each such segment then preferably starts with a RAP, typically in the form of a respective IRAP picture. The segment preferably also comprises at least one additional RAP, typically in the form of DRAP picture(s). For instance, if the segment has a total length of ten seconds then DRAP pictures could be present at each 0.5 s, each second or each 2 s.

The at least one DRAP picture in the segment constitutes a RAP at which a jump forward or fast forward operation can take place. Jump forward typically involves moving from a current playback or play out position within the video bitstream to another playback position that is subsequent to the current playback position. In this case, the playback "jumps" to the new position without playing back or out any intermediate video data. Fast forward is to move forward through a video stream at a speed faster than at which it would usually be played back or out.

In the jump forward scenario, the user typically selects a desired forward position within the video stream using a remote control, mouse, keyboard, touch sensitive screen or other input device of or connected to the user client. A jump forward request is generated indicating or representing the desired forward position. A RAP within the segment that is associated with the desired forward position is identified. If the associated RAP is an IRAP picture, this IRAP picture is decoded and output for display followed by decoding and output of pictures following the IRAP picture in decoding order and output order in the video bitstream. If the associated RAP is a DRAP picture, the RAP picture that is the sole reference picture for the DRAP picture is decoded, unless already provided in decoded form. The DRAP picture is decoded using the IRAP picture as sole reference picture. The decoded DRAP picture may then be output followed by decoding and output of pictures following the DRAP picture in decoding order and output order in the video bitstream. In a particular embodiment, the IRAP picture used as reference picture for the DRAP picture is preferably not output for display. Hence, the DRAP picture is output as the first picture following the jump forward request, whereas the IRAP picture is merely used as reference picture and is thereby not output for display following reception of the jump forward request.

The RAP associated with the desired forward position is preferably the RAP picture that is closest in time to the desired forward position. In a particular embodiment, the associated RAP is preferably the RAP picture that is closest in time but precedes the desired forward position or occurs at the desired forward position. In this particular embodiment, the user will not miss display of any video content from his/her desired jump forward position.

In the fast forward scenario, the user typically selects a fast forward operation using the input device of or connected to the user client. A fast forward request is generated and causes a fast forward output of video data of the video bitstream. Such a fast forward operation may be implemented by only decoding and outputting RAP pictures of the segment. For instance, the IRAP picture present at the start of the segment is decoded and output, followed by decoding and outputting the first DRAP picture of the segment, which is decoded using the IRAP picture as reference picture, in turn followed by decoding and outputting the second DRAP picture of the segment, which is decoded using the IRAP picture as reference picture, and so on until the end of the segment is reached and the procedure continues in the following segment of the video bitstream.

In this illustrative example of fast forward only RAP pictures are decoded and output for display, i.e. IRAP and DRAP pictures, whereas non-RAP pictures present in the segment of the video bitstream are not decoded nor output.

Encoding a picture as DRAP picture typically requires significantly fewer bits as compared to encoding the picture as IRAP picture. Hence, these embodiments enable efficient jump forward and fast forward operations as illustrative examples of trick play and random access operations but a lower bit cost for the video bitstream. Alternatively, more RAPs can be included in the video bitstream, i.e. the inter-RAP distance can be reduced, by using DRAP pictures as all or at least the majority of RAPs within the segments. In such a case, only the RAP at the start of the segment needs to be an IRAP picture.

FIG. 3 is a flow chart illustrating another embodiment of steps S1 and S2 in FIG. 1. The method starts in step S20, which comprises downloading a first part of a segment of encoded video data of the video bitstream. The first part of the segments comprises the IRAP picture and the segment is identified based on a jump forward request or a representation switch request. A following step S21 comprises downloading a second part of the segment starting with the DRAP picture identified based on the jump forward request or the representation switch request. The method then continues to step S3 in FIG. 1.

In this case, the segment containing the desired forward position represented by the jump forward request is not the current segment and thereby needs to be downloaded. However, instead of downloading the complete segment, this embodiment preferably only downloads the first part of the segment corresponding to the IRAP picture and a second part of the segment starting with the DRAP picture that is associated with, i.e. identified based on, the jump forward request.

The IRAP picture in the first part of the segment is then decoded and is used as reference picture when decoding the DRAP picture at the start of the second part of the segment. The DRAP picture is preferably output for display and the decoding and output for display continue with the following pictures of the second part of the segment. In a preferred embodiment, the IRAP picture in the first part of the segment is not output for display but is merely used as reference picture when decoding the DRAP picture and optionally as reference picture when decoding following pictures in the second part of the segment.

In another embodiment, the IRAP picture of the first segment and the pictures in the second segment from the DRAP picture up to the desired forward position represented by the jump forward request, is decoded but not output for display. The first picture that is output for display is the picture at the desired forward position followed by the subsequent pictures in output order.

The DRAP picture and thereby the start of the second segment is preferably identified based on the jump forward request as previously described herein, i.e. as the closest DRAP picture or the closest DRAP picture preceding the desired forward position.

The use of DRAP pictures reduces the need to download a complete segment when performing a jump forward operation and furthermore constitutes RAPs but at lower bit cost as compared to using IRAP pictures. DRAP pictures could, thus, decrease the time it takes to perform a jump forward operation.

Adaptive streaming enables, which has been described in the foregoing, switching between different representations of the video data, where the different representations carry video data encoded at different bit rates. A representation switch thereby involves switching from a current segment of a current representation, i.e. video bitstream at a current bit rate, to a new segment of a new representation, i.e. video bitstream of a new bit rate.

Hence, upon reception of a representation switch request indicating the target representation or video bitstream, a first part of a segment of the new representation is downloaded in step S20 followed by downloading a second part of the segment in step S21. The first part of the segment comprises an IRAP picture, whereas the second part starts with a DRAP picture that is preferably associated with the point in time at which the representation switch was requested. Hence, the DRAP picture is preferably the closest, such as closest preceding or closest following, DRAP picture with regard to the point in time of the representation switch.

Example Embodiment 1

A first example embodiment concerns adaptive streaming, for example through Dynamic Adaptive Streaming over HTTP (DASH).

Today DASH segments typically have lengths of about 10 seconds with IRAP pictures every second to enable trick play.

The quality of such segments can be increased through the use of DRAP pictures since DRAP pictures typically require lower bitrate than IRAP pictures for the same quality. With this embodiment the IRAP pictures that are not the first one in the segment are replaced by DRAP pictures.

In a first use case of the embodiment the client has downloaded the entire segment and performs trick play, e.g. fast forward or jump forward, within the segment. Jump forward is easily realized by decoding the IRAP picture that starts the segments, without displaying it, and then the DRAP picture that corresponds to the position selected by the user. Fast forward is realized by decoding the IRAP picture, and then the DRAP pictures in the segment.

In a second use case the user jumps to a segment that is not already downloaded. In order to start playout at the selected point the client needs to download only the first part of the segment corresponding to the IRAP picture and the part from the DRAP picture onwards.

In a third use case, switching of representation is performed within a segment, i.e. not at segment border. In order to perform the switch the client needs to download only the first part of the segment in the representation it is switching to corresponding to the IRAP picture and the part from the DRAP picture onwards.

Figure 16:
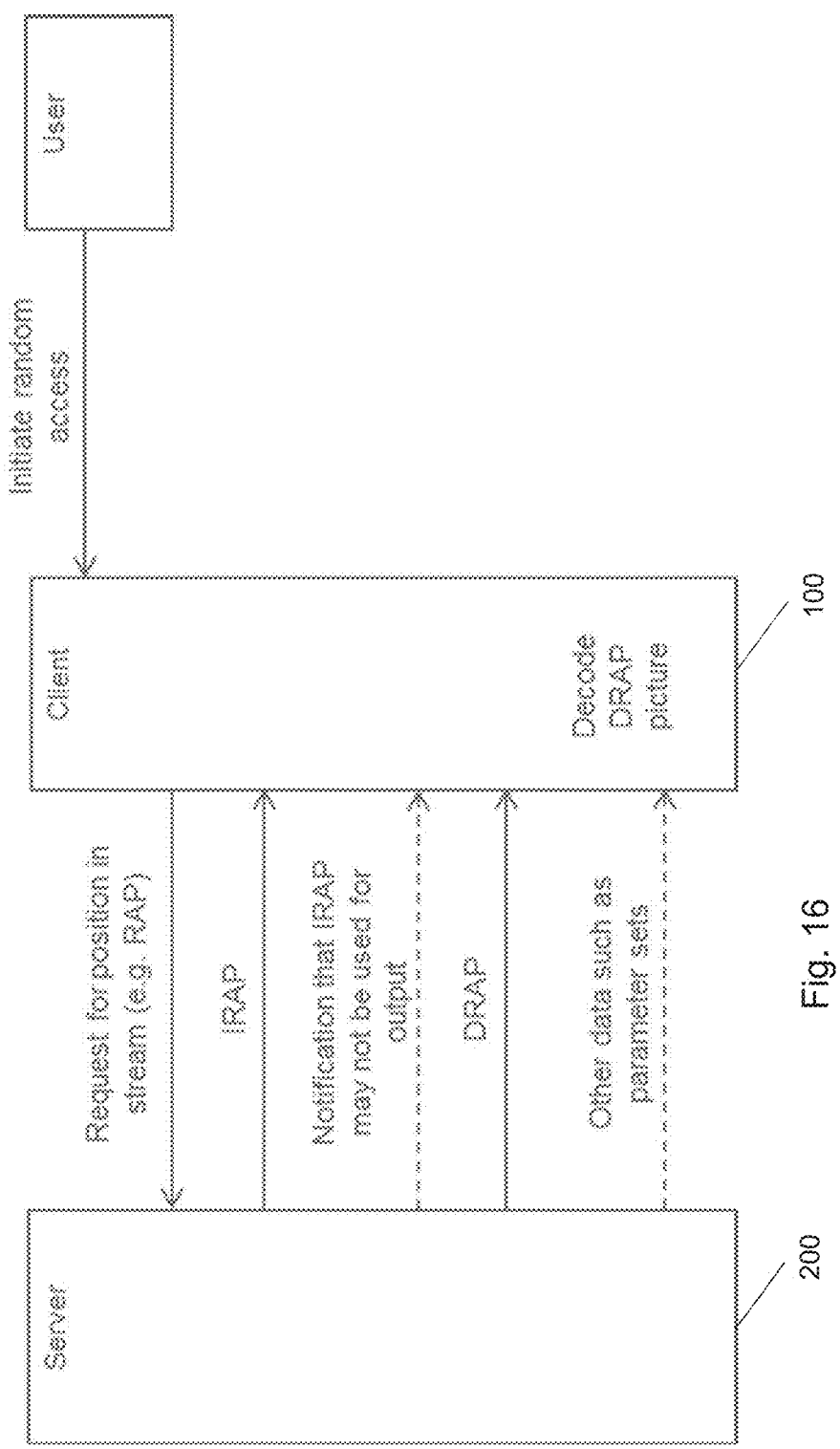
FIG. 16 is a signaling diagram describing a possible scenario for adaptive streaming.

The steps below are illustrated in the signaling diagram in FIG. 16.

A user client 100 may use the second or third use case by the following ordered steps:

1) Random access is initiated by user request or by other means.

2) The user client 100 sends a request to a server 200 for a position in a video bitstream. The user client 100 may know the available random access points and select one of those.

3) The user client 100 receives an IRAP picture, a DRAP picture and coded pictures following the DRAP picture in decoding order, and possibly other data such as parameter sets, e.g. video parameter set (VPS), sequence parameter set (SPS), picture parameter set (PPS). The user client 100 decodes the data and outputs the decoded pictures. The IRAP picture may not be output.

A server 200 may use the second or third use case by the following ordered steps:

1) The server 200 receives a request for a position in a video bitstream. The position may be a random access point using DRAP pictures.

2) The server 200 sends the IRAP picture associated with the DRAP picture, the DRAP picture and picture data that follows the DRAP picture, and possibly other data such as parameter sets. e.g. VPS, SPS, PPS. The server 200 may signal to the receiver that the IRAP picture should not be output or displayed by the user client 100. The server 200 may realize this for an HEVC bitstream by setting output_flag to 0 for the IRAP data.

A second example is suitable for, but not limited to, broadcasting services, such as terrestrial, satellite and cable services. In such a broadcasting service, a receiver receives a video bitstream of one channel, such as TV channel, which is decoded and the decoded video data is displayed to the user. It is also common that the receiver in addition receives video bitstreams of one or more additional channels.

FIG. 5 is a flow chart illustrating an embodiment suitable for broadcast services. The method starts in step S40, which comprises receiving and decoding a current video bitstream representing a current channel. A video bitstream representing another channel is received in step S41. A most recent IRAP picture of the video bitstream received in step S41 or a decoded version of the most recent IRAP picture is stored in a memory in step S42.

The following two steps S43 and S44 represent an embodiment of steps S1 and S2 in FIG. 1. Step S43 comprises retrieving the most recent IRAP picture of the decoded version of the most recent IRAP picture from the memory based on a channel switch request identifying the another channel. A next step S44 comprises receiving the DRAP picture as a next DRAP picture within the video bitstream following the channel switch request.

The method then continues to step S3 of FIG. 3, wherein the most recent IRAP picture is decoded. If the most recent IRAP picture is stored in decoded version this step S3 may be omitted as it has already been performed in connection with storing the most recent IRAP picture in the memory. The DRAP picture is then decoded using the decoded version of the most recent IRAP picture as the sole reference picture.

Steps S40 to S42 are preferably performed as long as the user is watching the current channel, i.e. up to the channel switch, which is schematically illustrated by the line L1 in FIG. 5. This means that the user client, in addition to receiving the current video bitstream, also receives at least one other video bitstream carrying encoded video data of at least one other channel. Step S42 then preferably comprises temporarily storing the most recent IRAP pictures or decoded versions thereof for each such other video bitstream. This means that only a single IRAP picture needs to be stored for each other video bitstream, although it is possible to keep more than one IRAP picture stored per video bitstream. Once a new IRAP picture is received from the at least one other video bitstream it may replace the IRAP picture stored in the memory for the at least one other video bitstream.

When the user would like to watch another channel than the current channel he/she uses an input device of or connected to the user client to generate a channel switch request indicating the desired channel. The most recent RAP picture or decoded version thereof for the channel and video bitstream indicated by the channel switch request is then retrieved from the memory. The channel switch may then be affected at the first or next DRAP picture received for the desired video bitstream. The IRAP picture retrieved from the memory is decoded, unless stored in decoded form, and is then used as reference picture when decoding the received DRAP picture. The DRAP picture may then be output for display followed by output of decoded picture following the DRAP picture according to the decoding and output order in the video bitstream. In a particular embodiment, the IRAP picture is only used as reference picture when decoding the DRAP picture and optionally when decoding following picture(s) in the video bitstream. Hence, the IRAP picture is preferably not output for display.

DRAP pictures of the embodiments enables an efficient channel switch since only IRAP pictures of other video bitstreams and channels need to be stored in the memory. Channel switch can then occur at the point in time corresponding to the first DRAP picture in the video bitstream following the channel switch request. The DRAP picture and following pictures of the video bitstream are guaranteed to be decoded since the most recent IRAP picture that is used as the sole reference for the DRAP picture is already available.

In some scenarios the receiver may not be able to receive and store the most recent IRAP picture for all available channels at a time, either due to bandwidth constraints or due to inadequate throughput or processing capabilities of the receiver. A possible solution would then be to, in addition to the currently watched channel, receive and store the most recent IRAP pictures for the channels that the user is most likely to switch to. This could include the channels that the user has a history of watching often and/or channels directly following and preceding the currently watched channel in the channel list. For instance, if a user is watching channel 5 in the channel list, channels 4, 6, 7 and 8 may be received simultaneously and the most recent IRAP pictures for these pictures could be stored.

Furthermore, since DRAP pictures constitute valid RAPs but at a lower cost as compared to IRAP pictures, more RAPs can be provided in the video bitstreams at no or merely low increase in bit cost. This means that the time from when a user requests a channel switch until the channel switch can be affected at a next RAP can be significantly reduced by using DRAP pictures as a complement to IRAP pictures.

Example Embodiment 2

A second example embodiment relates to broadcasting services. In broadcasting services IRAP pictures are typically sent with frequent interval, e.g. once per second, to enable reasonable channel switching times. Having even more frequent IRAP pictures would be desirable to decrease channel switching time even further, but it is not feasible since the IRAP pictures would then consume a large portion of the available bit rate and reduce the overall quality.

Assume that an end user is watching a channel. One way to solve the problem of channel switching delay is to have additional tuners that receive and store data from channels other than the current channel. However buffering all data from several other channels might not be feasible due to limitations in receiver and/or buffer capacity.

The problem can be solved through the use of DRAP pictures. Then only IRAP pictures from the other channels need to be buffered and the channel switch can be performed at the first DRAP picture that occurs after the user has selected to switch channel. DRAP pictures can be sent much more frequently than IRAP pictures, e.g. every 160 ms, without significantly affecting the overall quality.

In one embodiment, only the most recent IRAP picture in decoding order for each channel is stored. In one embodiment, the compressed IRAP picture is stored and decoding of the IRAP picture and DRAP picture is done when a channel switch or random access is triggered by the user or by other means. In another embodiment the IRAP picture is decoded before channel switch or random access is triggered such that only the DRAP picture data needs to be decoded upon random access.

Figure 15:
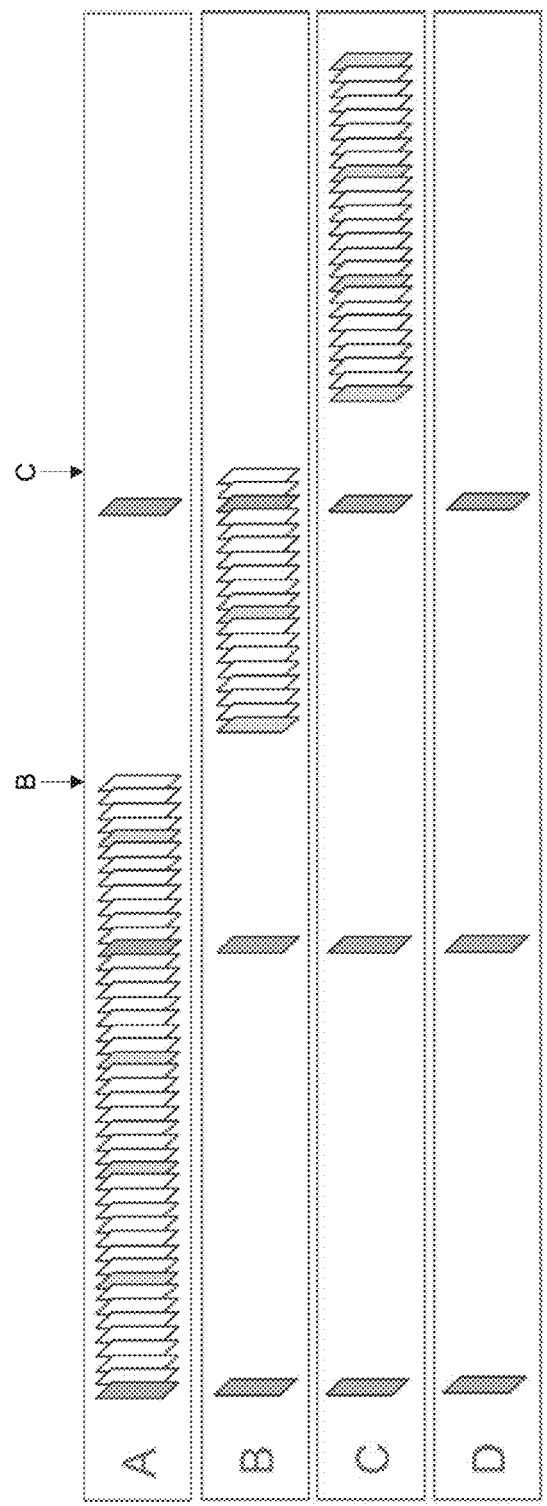
FIG. 15 illustrates an example of channel switching using DRAP pictures.

An example of channel switching using DRAP pictures is shown in FIG. 15. Dark gray pictures in FIG. 15 are IRAP pictures, medium gray pictures are DRAP pictures and white pictures are other temporal predictive pictures, i.e. non-RAP P-pictures and/or B-pictures. A user is watching channel A. Additional tuners receive and buffer the latest IRAP picture for channel B, C and D. At picture position 45 the user is switching to channel B, see arrow B. The channel B tuner waits 4 pictures for the next DRAP picture before the decoder can start to decode channel B with help from the buffered IRAP picture. At picture position 67 the user is switching to channel C, see arrow C. The decoder waits 6 pictures for the next DRAP picture before it can start to decode channel C. The latest IRAP picture is used to decode the DRAP picture. If the video bitstreams would not contain any DRAP pictures, the decoder would need to wait for the next IRAP picture before decoding after a channel switch. In the example below, the decoder would need to wait 20 pictures when switching between channels A and B and 30 pictures when switching between channels B and C.

A third example is suitable for, but not limited to, live streaming, server-controlled streaming and conversational services. In these type of services there is a feedback channel between the user client and the server providing the video bitstream. This could, as a non-limiting example, be based on Real-time Transport Protocol (RTP) with a RTP Control Protocol (RTCP) feedback channel. RTP is a network protocol for delivering audio and video over IP networks. RTP is used extensively in communication and entertainment systems that involve streaming media, such as telephony, video teleconference applications, television services and web-based push-to-talk features. RTP is used in conjunction with the RTCP. While RTP carries the media streams, RTCP is used to monitor transmission statistics and quality of service (QoS) and aids synchronization of multiple streams.

Conversational services include video teleconference applications, including massive video conferences.

FIG. 6 is a flow chart illustrating an embodiment illustrating additional steps of the method suitable for live streaming, server-controlled streaming and conversational services. The method starts in step S50, which is an embodiment of step S1 in FIG. 1. Step S50 comprises receiving a video bitstream comprising the IRAP picture on a communication channel. The IRAP picture is then decoded in step S3 of FIG. 1. The following steps S51 and S52 represent an embodiment of step S2 in FIG. 1. Step S51 comprises transmitting a feedback message on a feedback channel following detection of a corrupt or missing picture in the video bitstream. The feedback message indicates a position within the video bitstream corresponding to the corrupt or missing picture. A next step S52 comprises receiving the DRAP picture generated based on the feedback message. The method then continues to step S4 of FIG. 1, where the DRAP picture is decoded using the IRAP picture decoded in step S3 as the sole reference picture.

In this embodiment, encoded video data of the video bitstream is sent over the communication channel. The user client then detects a corrupt or missing picture in the video bitstream and compiles and sends a feedback message on the feedback channel. As an example, the communication channel could use RTP whereas the feedback channel uses RTCP. A DRAP picture is thereby generated and encoded using an IRAP picture as sole reference picture. This IRAP picture is preferably the most recent IRAP picture in the video bitstream prior to the position of the corrupt or missing picture in the video bitstream. This position is indicated in the feedback message, thereby allowing a server to generate and transmit the DRAP picture over the feedback channel.

The user client can thereby resume correct decoding and output of video data in the video bitstream starting from the position of the received DRAP picture, which is decoded using the previously received and decoded RAP picture. Encoded pictures following the DRAP picture are preferably received over the communication channel and these pictures are decoded and output to resume the video display.

Thus, DRAP pictures of the embodiments can be used as an efficient tool to handle corruptions or lost pictures in a video bitstream to thereby enable a random access operation following such a corrupt or missing picture.

Example Embodiment 3

A third example embodiment concerns live streaming and conversational services in which there is a feedback channel. This could for example be based on RTP with an RTCP feedback channel. The feedback channel can be used to report loss of pictures or any type of problems in the decoding process, and is typically used in one-to-one applications but may also be used in one-to-many scenarios. One specific example is two-way video telephony or video conferencing.

A typical prior art response from an encoder to a feedback message sent from the client decoder and indicating that the decoded video is corrupt is to send an IRAP picture to refresh the video.

In this embodiment, an encoder may instead respond to a feedback message by using an older previously received picture for prediction instead of newer pictures which may be corrupt or missing in the decoder. An encoder may signal to the decoder that a specific picture should be kept in the decoded picture buffer (DPB) by indicating that the picture is a long-term picture. If the older picture is an IRAP picture, the encoder can encode the next picture, after it has received a feedback message, as a DRAP picture. The decoder indicates in the feedback message to the encoder from when the video is corrupt. The encoder then knows whether the IRAP can be used to encode a DRAP picture.

The advantage of requesting a DRAP picture compared to requesting an IRAP picture is that DRAP pictures have better compression efficiency.

In massive video conference, i.e. one-to-many video conference the conference server needs to request an expensive IRAP picture from the sender each time a new participant joins the conference according to prior art techniques. However, using DRAP pictures of the embodiments solves such problems. When a new participant joins the video conference, the conference server sends the previous IRAP by unicast, such as using the feedback channel, to that participant. The conference server may then request a correspondingly inexpensive DRAP picture from the sender. The new participant can join the video conference once a next DRAP picture occurs in the video bitstream. In this case, the participant uses the IRAP picture received from the conference server by unicast reception as reference picture when decoding the DRAP picture.

Another use case is server-controlled streaming. In this example, the user client requests a specific position in a video bitstream to be delivered from the server, e.g. by using a PLAY request with range value in Real Time Streaming Protocol (RTSP). The server may on-the-fly construct the video bitstream to be delivered by concatenating a previous IRAP picture with the DRAP picture that corresponds to the start of the requested range.

For instance, the user client could request start at a position at 37 s in the video bitstream. The server identifies a DRAP picture that is associated with the desired start position. The server may then compile a video bitstream by concatenating the most previous IRAP picture, such as corresponding to the start of the video bitstream (position 0 s), with the identified DRAP picture.

Figure 17:
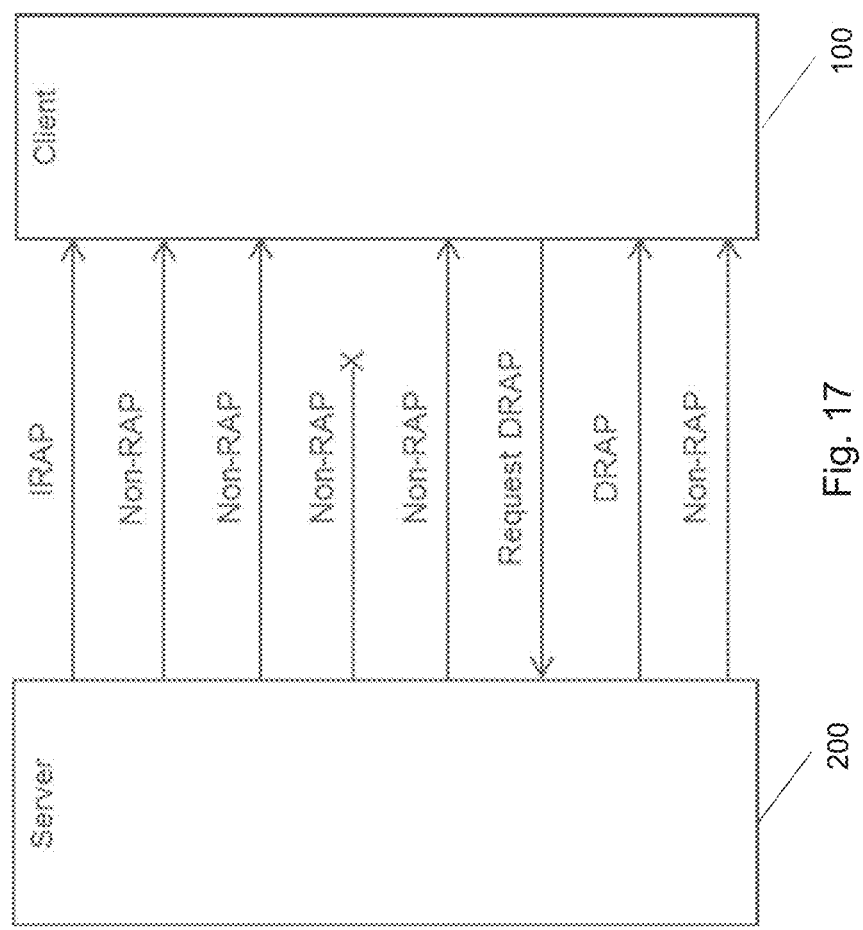
FIG. 17 is a signaling diagram describing a possible scenario for live streaming and conversational services.

FIG. 17 illustrates a signaling diagram showing a server 200 sending an IRAP picture followed by non-RAP pictures to a user client 100. A non-RAP picture is lost in transmission. The user client 100 detects that a picture has been list when it receives the next picture in turn. The user client 100 then sends a feedback message requesting a DRAP picture from the server 200 and indicates which received IRAP picture is should depend on. The server 200 encodes the DRAP picture and sends it to the user client 100 followed by non-RAP pictures of the video bitstream.

A decoder that receives a DRAP picture may ignore data preceding the DRAP picture, e.g. that may be present in the pre-decoding buffer of the decoder, since that data will likely result in corrupt decoded pictures.

If the DRAP picture is indicated using one of the SEI messages described above the encoder can set broken link flag equal to 1 to highlight that there might be problems with pictures that precedes the DRAP picture in decoding order.

FIG. 7 is a flow chart illustrating a video communication method according to an embodiment. The method comprises transmitting, in step S60, a video bitstream comprising at least one IRAP picture on a communication channel to a user client. A next step S61 comprises receiving a feedback message on a feedback channel from the user client. The feedback message indicates a position within the video bitstream corresponding to a corrupt or missing picture at the user client. The following step S62 comprises encoding, based on the feedback message, a DRAP picture using a previous IRAP picture in the video bitstream as sole reference picture for the DRAP picture. The DRAP picture is encoded in step S62 as a trailing picture that may be used for reference and constitutes a random access point in the video bitstream. The DRAP picture is then transmitted to the user client in step S63.

The video communication method described above and illustrated in FIG. 7 preferably corresponds to the operations performed by a server communicating with one or more user clients, such as shown in FIG. 17 and described above. Hence, the video communication method is in particular suitable for live streaming, server-controller streaming and conversational services, such as two-way video telephony and video conferencing. The communication channel preferably uses RTP as network protocol to transmit the video bitstream, whereas RTCP can be used to support the feedback channel and transmission of the feedback message.

In a particular embodiment, the DRAP picture is transmitted to the user client in step S63 using the communication channel. In another particular embodiment, the DRAP picture is transmitted to the user client in step S63 using the feedback channel.

In an embodiment, the feedback message indicates the corrupt or missing picture, for instance by indicating the POC value of the corrupt or missing picture. Step S62 then comprises encoding a picture, identified or selected based on the POC value, as a DRAP picture.

In an embodiment, the server uses information contained in the feedback message in order to select which type of RAP picture to encode and transmit to the user client in response to the feedback message. Thus, the server selects between using an IRAP picture and using a DRAP picture. The decision of RAP picture type is preferably based on the information contained in the feedback message and the buffer status of the DPB at the point in time corresponding to the corrupt or missing picture. This point in time is in turn determined based on the information contained in the feedback message. Thus, the server uses the information in order to determine whether the user client will have at least one decoded IRAP picture in its DPB and where such a decoded IRAP picture could be used as reference picture for a DRAP picture. Thus, if the DPB of the user client stores at least one decoded IRAP picture, the server preferably selects the most recent IRAP picture, if more than one IRAP picture in the DPB, and uses it as reference picture when encoding a DRAP picture in step S62.

However, if the server concludes that the DPB of the user client does not have a stored IRAP picture that could be used as reference picture, then the server needs to encode an IRAP picture and send it to the user client. Thus, in this case the bit cost will be larger as compared to the case in where the picture could instead be encoded as a DRAP picture.

In a particular embodiment, the server may signal in the video bitstream all or at least some of the IRAP pictures as long-term pictures in order to increase the chances of having an IRAP picture stored in the DPB of the user client once a corrupt or missing picture is detected.

The encoder at the server has access to a DPB similar to the decoder at the user client. Hence, the encoder is fully aware of the buffer status of the DPB at the decoder at each point in time since the buffer status of the DPB at the decoder mimics or reflects the corresponding buffer status of the DPB at the encoder.

FIG. 8 is a flow chart illustrating an additional, optional step of the video communication method of FIG. 7. The method continues from step S63 in FIG. 7. A next step S70 comprises transmitting at least one non-RAP picture following the DRAP picture in output order and decoding order to the user client. The at least one non-RAP picture does not use any non-RAP picture preceding the DRAP picture in decoding order in the video bitstream as reference picture.

FIG. 9 is a flow chart illustrating a method for encoding a video stream of pictures into a video bitstream. The method comprises encoding, in step S80, every $n^{th}$ picture in the video bitstream as a RAP picture and encoding the other pictures in the video stream as non-RAP pictures.

FIG. 10 is a flow chart illustrating an embodiment of step S80 in FIG. 9. This embodiment comprises step S81, which comprises encoding every $m^{th}$ RAP picture as an IRAP picture and encoding the other RAP pictures a DRAP pictures using a respective closest preceding, according to a decoding order, IRAP picture as sole reference picture for the DRAP picture. Each DRAP picture is encoded in step S81 as a trailing picture and constitutes a random access point in the video bitstream.

Hence, in this embodiment the frequency of RAPs within the video bitstream is defined by the parameter n and the frequency or ratio of DRAP pictures relative to IRAP pictures is defined by the parameter m. The result of the encoding in step S81 is thereby a video bitstream with every $n^{th}$ picture as a RAP picture and every $m^{th}$ RAP picture is an IRAP picture whereas remaining RAP pictures are DRAP pictures. Remaining pictures in the video bitstream are non-RAP pictures, i.e. non-RAP P- or B-pictures.

FIG. 11 is a flow chart illustrating another embodiment of step S80 in FIG. 9. This embodiment starts in step S82, which comprises determining, for at least a subset of the RAP pictures, whether the RAP picture is to be encoded as an IRAP picture or as a DRAP picture based on a bit-cost difference between encoding the RAP picture as an IRAP picture or as a DRAP picture. A DRAP picture is encoded using a respective closest preceding, according to a decoding order, RAP picture as sole reference picture for the DRAP picture. The DRAP picture is encoded as a trailing picture and constitutes a random access point in the video bitstream.

In an embodiment, the method comprises encoding the RAP picture as a DRAP picture in step S83 if an estimated bit cost for encoding the RAP picture as a DRAP picture is lower than an estimated bit cost for encoding the RAP picture as an IRAP picture minus a threshold and otherwise encoding the RAP picture as an IRAP picture in step S84.

Hence, in an embodiment the estimate bit cost for encoding the RAP picture as a DRAP picture (bit cost(DRAP)) is compared in step S82 with a difference in estimated bit cost for encoding the RAP picture as an IRAP picture (bit cost(IRAP) and the threshold (T). If bit cost(DRAP)<(bit cost(IRAP)−T) then the method continues to step S83, where the RAP picture is encoded as a DRAP picture. However, if bit cost(DRAP)≥(bit cost(IRAP)−T) the method instead continues to step S84, where the RAP picture is encoded as an IRAP picture.

This means that if the bit cost of encoding the RAP as an IRAP picture is substantially the same as the bit cost of encoding the RAP as a DRAP picture or is not more than T plus the bit cost of encoding the RAP as a DRAP picture the RAP is encoded as an IRAP picture and otherwise as a DRAP picture.

The threshold T is preferably a positive number such that IRAP pictures are favored over DRAP pictures since IRAP pictures provide random access independent of other pictures. T could be a constant based on a wanted or measured bitrate of the video bitstream. T could also be based on the bit cost(DRAP) and/or the bit cost(IRAP). For instance, T could be equal to c×bit cost(IRAP) such that DRAP pictures are selected if bit cost(DRAP)/bit cost(IRAP)<1−c, otherwise IRAP pictures are selected. A value of c between 0 and 1, e.g. 0.25, would favor selecting IRAP pictures.

In a particular embodiment the method also comprises performing the determination whether the RAP picture is to be encoded as an IRAP picture or a DRAP picture in step S82 only if encoding the RAP picture as a DRAP picture would not lead to a distance between successive IRAP pictures in the video bitstream that is larger than a maximum distance and otherwise encoding the RAP picture as an IRAP picture.

In this embodiment there is a maximum distance between two successive IRAP pictures in the video bitstream, such as every 10 s or every 60 s as illustrative but non-limiting examples. If encoding a RAP picture as a DRAP picture would cause an inter-IRAP distance to be larger than this maximum distance then the RAP picture is encoded as an IRAP picture without any comparison of bit costs.

Example Embodiment 4

A fourth example embodiment relates to any of the services described in earlier example embodiments.

An encoder encodes a video sequence or stream and selectively chooses between using either IRAP or DRAP pictures for random access points. In one use case the frequency of random access points is fixed and the frequency of DRAP pictures relative to IRAP pictures is also fixed. The encoder encodes every $n^{th}$ picture as a random access point picture. The other pictures are encoded as non random access point pictures. Among random access point pictures, the encoder encodes every $m^{th}$ picture as an IRAP picture. The other random access point pictures are encoded as DRAP pictures that optionally reference the most previously encoded IRAP picture.

In a second use case, the decision on whether a random access point picture should be encoded as an IRAP picture or a DRAP picture is made by estimating the bit-cost difference between encoding a particular candidate random access point picture as an IRAP picture or DRAP picture. A threshold T is used to make the decision such that if the estimated bit cost for the DRAP picture is lower than the estimated bit cost for encoding the picture as an IRAP picture minus T, the picture is encoded as a DRAP picture. Otherwise, the picture is encoded as an RAP picture.

In pseudo-code:

```
If(BitEstimatedDRAP(current_picture) <
BitsEstimatedIRAP(current_picture) - T)
    EncodePictureAsDRAP(current_picture);
else
    EncodePictureAsIRAP(current_picture);
```

T may here be a positive number such that IRAP pictures are favored.

This second use case may be combined with the first use case such that there is a maximum distance between RAP pictures in the output bitstream. This can be realized by invoking the pseudo-code only if the choice of encoding the current picture as DRAP would not lead to an IRAP distance larger than the maximum distance. If that is the case, the current picture is encoded as an IRAP without considering encoding the picture as a DRAP picture.

The proposed solutions of the embodiments aim to decrease the large number of bits that are spent on IRAP pictures in screen content coding as well as general content coding while maintaining almost the same random access and error robustness properties of IRAP pictures. This is done by introducing a new picture type, here called a dependent random access point (DRAP) picture. The DRAP picture is a temporal predictive picture, such as P-picture, that may only reference a previous RAP picture (and in some embodiments also other DRAP pictures). The previous RAP picture may be a picture that corresponds to an encoded representation of a picture earlier in the video sequence. Alternatively the previous RAP picture may be a picture that is not output but only constitutes a good reference for the pictures in the video sequence, e.g. representing the background of a scene.

Random access is provided for DRAP pictures with the restriction that the referenced IRAP picture (and if relevant referenced DRAP pictures) must be decoded before decoding the DRAP picture. The DRAP picture is for instance very useful for fast forwarding through video, at the same time as the bitrate overhead for random access is kept to a minimum.

Another restriction is that prediction across DRAP pictures must be prohibited. Non-RAP pictures that follow the DRAP picture must not use any non-RAP picture that precedes the DRAP picture for prediction. One alternative formulation of this restriction is that no non-RAP picture that follow a DRAP picture in both decoding and output order may use any non-RAP picture for reference that precede the DRAP picture in decoding order.

In HEVC, as well as in AVC/H.264, there is a Supplemental Enhancement Information (SEI) message called Recovery Point SEI. The recovery point SEI message assists a decoder in determining when the decoding process will produce acceptable pictures for display after the decoder initiates random access or after the encoder indicates a broken link in the video bitstream. When the decoding process is started with the picture in decoding order associated with the recovery point SEI message, all decoded pictures at or subsequent to the recovery point in output order specified in this SEI message are indicated to be correct or approximately correct in content. Recovery point SEI messages cannot be used to realize the functionality of DRAP pictures. If a recovery point SEI message is sent together with the IRAP picture then all pictures that follow it in decoding order must be decoded up until the DRAP picture, which is not desirable. And the recovery point SEI message cannot be sent together with the DRAP picture since it is not possible to indicate dependency on anything that precedes the recovery point SEI message in decoding order.

The DRAP picture indication can be combined with an indication about known problems in the encoded video prior to the DRAP picture. A receiver that encounters a DRAP picture with this indication set can discard everything that precedes the DRAP since that data has been indicated to be erroneous.

IRAP pictures are commonly used in a periodic way to provide random access and error robustness for encoded video. For general video content, IRAP pictures are typically around 3-5 times as expensive to encode as P-pictures and around 5-10 times as expensive to encode as B-pictures in terms of bitrate. Inserting an IRAP picture every 0.5 to 1.0 seconds cost quite some bits.

Video services that often have very static content includes screen sharing and surveillance video. Screen sharing could for instance be used as a live communication tool between individuals or could be set up to monitor other computers such as servers. For all these services it is often of interest to record and store the video material. The stored video material should then preferably be easy to search using random access operations. At the same time it is of interest to keep the video bitrate at a minimum, both to limit the bandwidth usage and to save storage space.

Specific screen content services such as screen sharing and screen monitoring are becoming increasingly popular. Screen content puts other demands on video coding than for encoding of general video coding. Screen content typically includes windows with sharp edges, graphics and text, distinct colors and tends to have areas of the video picture that are not updated for long periods of time.

During the development of HEVC version 1 the special characteristics of screen content coding was not explicitly addressed. JCT-VC is therefore now working on an extension to HEVC explicitly targeting screen content coding.

The DRAP pictures of the embodiment can replace some of the IRAP pictures to reduce the overall bit cost of a bit stream. Alternatively, random access points can be placed more frequently given the same bitrate. Random access on a DRAP picture is done by first decoding the preceding IRAP picture and then decoding the DRAP picture.

In one embodiment of the invention only intra or skip blocks are allowed for the DRAP picture to provide improved error robustness.

In a particular embodiment, the DRAP picture is decoded by decoding the blocks of the DRAP pictures as skip blocks using the IRAP picture as the sole reference picture for the DRAP picture or as intra blocks.

A skip block implies that the block is encoded according to the skip mode using the IRAP picture as the sole reference picture. This means that sample or pixel values for the skip block are copied from the collocated block in the reference picture without any motion compensation. A combination of the skip mode and the intra mode for the blocks of the DRAP picture is thereby an efficient way of encoding and decoding the DRAP picture.

Hence, those blocks of the DRAP picture that have not changed or not changed more than some defined minimum difference relative to the closest preceding IRAP picture are preferably encoded and decoded as skip blocks, whereas blocks of the DRAP picture that have changed, or changed more than the defined minimum reference, relative to the reference picture are encoded and decoded as intra blocks.

In an another embodiment, a block of the DRAP picture is encoded as a skip block using the IRAP picture as the sole reference picture for the DRAP picture if a collocated block in the RAP picture is identical with or does not differ more than a defined threshold from a collocated block in another IRAP picture and is otherwise encoded as an intra block. The another IRAP picture precedes, according to the decoding order, the IRAP picture in the video stream and is preferably the closest preceding IRAP picture that is encoded prior to encoding the IRAP picture. In a particular embodiment, a block of the DRAP picture is encoded as a skip block using the IRAP picture of the video stream as the sole reference picture for the DRAP picture if a collocated block in the IRAP picture is identical with or does not differ more than a defined threshold from a respective collocated block in the another IRAP picture and in intermediate pictures present in between the another IRAP picture and the IRAP picture according to the decoding order and is otherwise encoded as an intra block.

Decoding of a block according to an intra mode, i.e. decoding of an intra block, is preferably performed as specified in section 8.4 Decoding process for coding units coded in intra prediction mode of ITU-T H.265 Series H: Audiovisual and multimedia systems, Infra structure of audiovisual services—Coding of moving video, High efficiency video coding. Decoding of a block according to an inter mode, i.e. decoding of an inter block, such as a skip block, is preferably performed as specified in section 8.5 Decoding process for coding units coded in inter prediction mode of ITU-T H.265 Series H: Audiovisual and multimedia systems, Infra structure of audiovisual services—Coding of moving video, High efficiency video coding. Decoding skip blocks, i.e. block having a value of the skip flag equal to 1, is in particular described in section 8.5.4.1 General of ITU-T H.265 Series H: Audiovisual and multimedia systems, Infra structure of audiovisual services—Coding of moving video, High efficiency video coding.

In HEVC, the skip mode is similar to the new merge mode with the exception that residual data is skipped. The merge mode selects motion parameter from one of four spatial candidates, one temporal candidate and a zero motion candidate. Hence a skipped block is preferably decoded according to the skip mode in HEVC with the zero motion candidate selected.

According to a first aspect a method for encoding a video bitstream is provided. In the method an IRAP picture is encoded, and an inter picture that only depends on the IRAP picture is encoded, wherein the inter picture is referred to as a dependent random access point (DRAP) picture.

According to a second aspect a method for decoding a video bitstream is provided. In the method, an intra random access point (IRAP) picture is decoded, an inter picture that only depends on the IRAP picture is decoded, wherein the inter picture is referred to as dependent random access point (DRAP) picture, and the DRAP picture is used to perform a random access operation.

Figure 18:
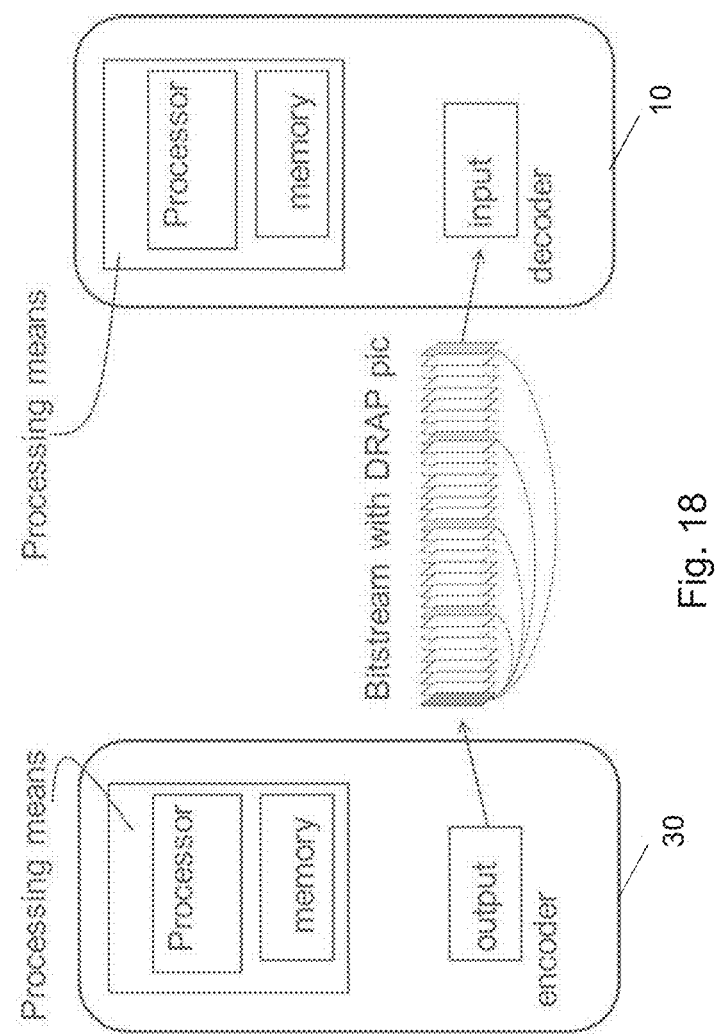
FIG. 18 is a schematic overview of an encoder and a decoder according to an embodiment.

According to a third aspect as shown in FIG. 18, an encoder 30 for encoding a video bitstream is provided. The encoder 30 comprises processing means adapted to:
encode an IRAP picture, and
encode an inter picture that only depends on the IRAP picture, wherein the inter picture is referred to as a dependent random access point (DRAP) picture.

According to a fourth aspect a decoder 10 for decoding a video bitstream is provided. The decoder 10 comprises processing means adapted to:
decode an intra random access point (IRAP) picture, and
decode an inter picture that only depends on the IRAP picture, wherein the inter picture is referred to as dependent random access point (DRAP) picture, and the DRAP picture is used to perform a random access operation.

In the encoder 30 and the decoder 10, respectively, the processing means comprise a processor and a memory wherein said memory comprises instructions, when executed by said processor, are configured to perform the methods described herein.

The encoder 30 may comprise an output unit for sending the encoded bitstream with control information exemplified by e.g. SEI message and the decoder 10 comprises an input unit for receiving the video bitstream and the control information.

The encoder 30 and the decoder 10, respectively may be located in a device such as a user terminal or a network node. The user terminal may be e.g. a video camera, a mobile phone, or a tablet.

It should be appreciated that the example embodiments may provide for the instructions to be given in a number of ways.

An advantage with embodiments is that a lot of bandwidth can be saved, or traded for higher overall quality, by in a random access configuration bitstream encode some of the random access points (RAP) as DRAP pictures instead of encoding all RAPs as IRAP pictures.

DRAP pictures makes it possible to provide short channel switching time in a multi-tuner scenario without increasing the bitrate substantially and without having to store multiple different streams entirely.

DRAP pictures make it possible to reduce the size of video bitstreams in an adaptive streaming scenario without reducing the ability to switch representations and jump to different positions in a video.

When DRAP pictures is combined with an indication about known problems in the encoded video prior to the DRAP picture it is possible for a receiver to identify from which picture onwards the video will be free of problems.

FIG. 12 shows a random access configuration for HEVC with periodic IDR pictures every $8^{th}$ picture. Typically, IRAPs are inserted around every 0.5-2 seconds for broadcasted content. For a 30 Hz sequence this means that around every 15 to 60 picture is an IRAP picture. The dark gray pictures are IDR pictures and the white pictures are P- or B-pictures.

Figure 14:
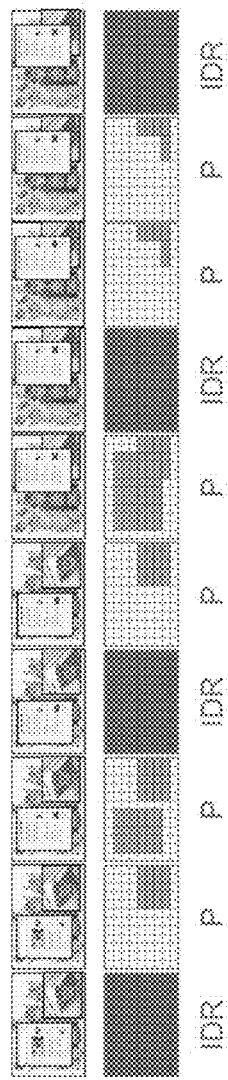
FIG. 14 illustrates an example of screen content coding using the traditional IRAP approach.

Using the traditional random access approach for screen content or other general content where the video is not updated much over time, could look something like FIG. 14. In the simplified example an IRAP has been inserted every $3^{rd}$ picture. For illustration purposes the blocks are also much larger than they would be for video encoded with HEVC at a more normal resolution. The P-pictures in this example references the previous picture. For every IDR picture the video is instantaneously refreshed by intra coding each block in the picture. Intra blocks are marked in dark gray, inter blocks in gray (some of these may also be intra blocks) and white blocks are skipped blocks.

Figure 13:
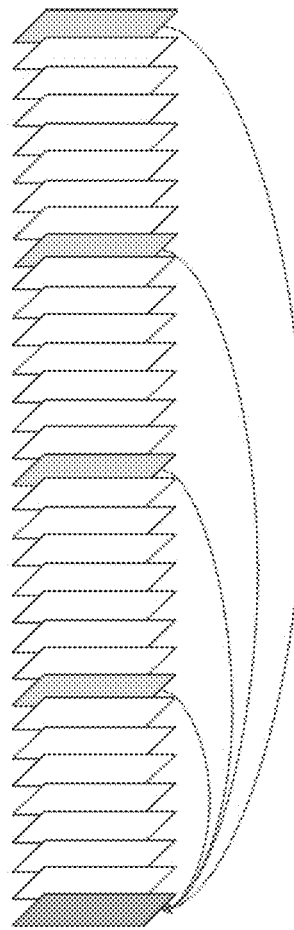
FIG. 13 schematically illustrates a video bitstream with random access configuration using DRAP pictures.

In the current invention a new RAP picture type is introduced and is referred to as DRAP. Blocks in the DRAP picture may only reference a previous IRAP picture. References to other pictures are not allowed. In one aspect of the invention some of the RAPs are encoded as DRAP pictures instead of IRAP pictures. The prediction pattern is illustrated in FIG. 13. The dark gray picture is an IDR picture, the medium gray pictures are DRAP pictures and the white pictures are P- or B-pictures. The DRAP pictures may only reference the IDR picture.

To decode a DRAP picture the previous referenced IRAP picture needs to be decoded. By not having to encode all blocks in the DRAP picture using intra coding a lot of bitrate can be saved. Still, some level of random access can be achieved by only having to reference the previous IRAP (IDR, CRA and BLA) picture. In the current invention, the restrictions of the DRAP pictures may be signaled using an SEI message. If the DRAP picture is signaled using an SEI message it is not necessary to signal the DRAP as a specific picture type in the bitstream.

The present embodiments are particularly suitable for usage in connection with HEVC decoding and encoding, i.e. decoding according to the HEVC specification or standard and encoding of video data into video bitstreams complying with the HEVC specification or standard. The HEVC specification or standard includes any version of the HEVC specification, including HEVC version 1 and subsequent versions, and any extension to the HEVC specification, such as relating to screen content extension, multiview extension and scalable extension.

A person skilled in the art would understand that even though HEVC has been used as base to describe the embodiments herein, the embodiments would work equally well for other video coding standards using temporal predictive coding including AVC/H.264, H.263, MPEG-4, VP8 and VP9.

An IRAP picture as described herein constitutes an intra random access point picture, i.e. a picture that constitutes and can thereby be used as a random access point and is encoded and decoded using spatial, i.e. intra, prediction and thereby comprises only intra coded blocks. As mentioned in the foregoing, according to the HEVC specification an RAP picture could be in the form of an IDR picture, a CRA picture or a BLA picture. In other video coding standards, such as mentioned above, other particular picture type names may be used in order to define an intra random access point picture, such as key picture or key frame. However, also such other particular picture types are, for such other video coding standards, regarded as being encompassed by the expression IRAP picture as used herein as long as they constitute and can thereby be used as random access point and are encoded and decoded using spatial or intra prediction only. In video coding, a picture of a video stream is sometimes referred to as a frame.

Another aspect of the embodiments relates to a user client. The user client is configured to obtain a DRAP picture that is encoded as a trailing picture that may be used for reference and constitutes a random access point in the video bitstream. The use client is also configured to obtain an IRAP picture of the video bitstream. The user client is further configured to decode the IRAP picture. The user client is additionally configured to decode the DRAP picture using the IRAP picture as sole reference picture for the DRAP picture. The user client is also configured to perform a random access operation at the decoded DRAP picture.

In an embodiment the user client is configured to decode the DRAP picture using a closest preceding, according to the decoding order, IRAP picture in the video bitstream as the sole reference picture for the DRAP picture.

In an embodiment, the user client is configured to decode at least one non-RAP picture of the video bitstream following the DRAP picture in output order and decoding order. The at least one non-RAP picture does not use any non-RAP picture preceding the DRAP picture in decoding order in the video bitstream as reference picture.

In an embodiment, the user client is configured to output the decoded DRAP picture. The user client is preferably also configured to output the at least one decoded non-RAP picture.

In a particular embodiment, the user client is configured to receive an output flag associated with the IRAP picture indicating that the IRAP picture should not be output. Hence, in this particular embodiment, the DRAP picture and following non-RAP pictures but not the IRAP picture are output, such as output for display.

In an embodiment, the user client is configured to identify the DRAP picture in the video bitstream at least partly based on a SEI message associated with the DRAP picture.

In an embodiment, the user client is configured to identify the IRAP picture in a DPB based on an identifier of the IRAP picture present in a RPS of the DRAP picture.

In an embodiment, the user client is configured to download a segment of encoded video data of the video bitstream. The segment starts with the IRAP picture and comprises at least one DRAP picture.

The user client is also configured to identify the DRAP picture in the segment based on a jump forward or fast forward request.

In an embodiment, the user client is configured to download a first part of a segment of encoded video data of the video bitstream. The first part of the segment comprises the IRAP picture and the segment is identified based on a jump forward request or a representation switch request. The user client is also configured to download a second part of the segment starting with the DRAP picture identified based on the jump forward request or the representation switch request.

In an embodiment, the user client is configured to receive and decode a current video bitstream representing a current channel. The user client is also configured to receive the video bitstream representing another channel. The user client is further configured to temporarily store a most recent IRAP picture of the video bitstream or a decoded version of the most recent IRAP picture in a memory. The user client is additionally configured to retrieve the most recent IRAP picture of the decoded version of the most recent IRAP picture from the memory based on a channel switch request identifying the another channel. The user client is also configured to receive the DRAP picture as a next DRAP picture within the video bitstream following the channel switch request.

In an embodiment, the user client is configured to receive a video bitstream comprising the IRAP picture on a communication channel. The user client is also configured to transmit a feedback message on a feedback channel following detection of a corrupt or missing picture in the video bitstream. The feedback message indicates a position within the video bitstream corresponding to the corrupt or missing picture. The user client is further configured to receive the DRAP picture generated based on the feedback message.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Figure 19:
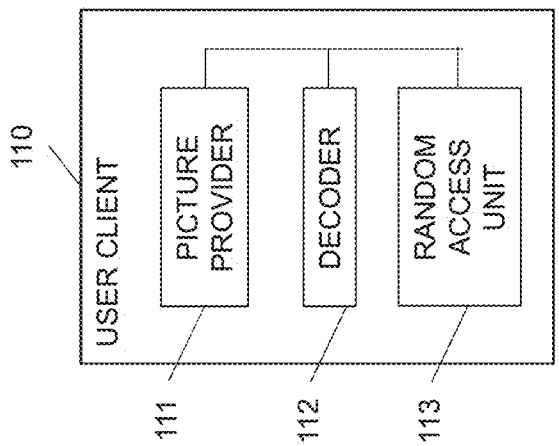
FIG. 19 is a schematic block diagram of a user client according to an embodiment.

FIG. 19 illustrates a particular hardware implementation of a user client 110 according to an embodiment. The user client 110 comprises a picture provider 111 configured to obtain the DRAP picture and the IRAP picture. The user client 110 also comprises a decoder 112 configured to decode the IRAP picture and decode the DRAP picture using the IRAP picture as the sole reference picture for the DRAP picture. The user client 110 further comprises a random access unit 113 configured to perform the random access operation at the DRAP picture.

The decoder 112 preferably comprises or is connected to a decoded picture buffer (DPB) that is configured to temporarily store decoded pictures generated by the decoder 112. The decoded pictures are preferably stored in the DPB to be used as reference picture when decoding subsequent pictures in the video bitstream and/or stored until the pictures should be output according to the output order.

The picture provider 111 is preferably connected to the decoder 112 to forward pictures to be decoded to the decoder 112. The decoder 112 is correspondingly connected to the random access unit in order to forward the DRAP picture to the random access unit 113, where the DRAP picture is used in order to perform the random access operation.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 20:
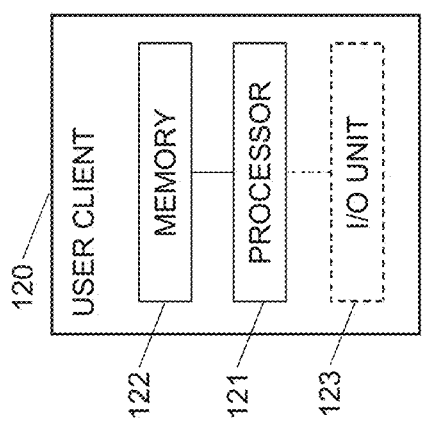
FIG. 20 is a schematic block diagram of a user client according to another embodiment.

In a particular example, the user client 120, see FIG. 20, comprises a processor 121 and a memory 122 comprising instructions executable by the processor 121. The processor 121 is operative to obtain the DRAP picture and the IRAP picture. The processor 121 is also operative to decode the IRAP picture and decode the DRAP picture using the RAP picture as the sole reference picture for the DRAP picture. The processor 121 is further operative to perform the random access operation at the DRAP picture.

In an embodiment, the user client 120 also comprises an input/output (I/O) unit 123 configured to receive the video bitstream and to output decoded pictures. The I/O unit 123 could be implemented as a transceiver, a receiver and a transmitter or as an input port and an output port.

The memory 122 of the user client 120 preferably comprises the DPB used by the processor 121 in order to store and access decoded pictures.

In a particular embodiment, the processor 121 is operative, when executing the instructions stored in the memory 122 to perform the above described operations. The processor 121 is thereby interconnected to the memory 122 to enable normal software execution.

Figure 26:
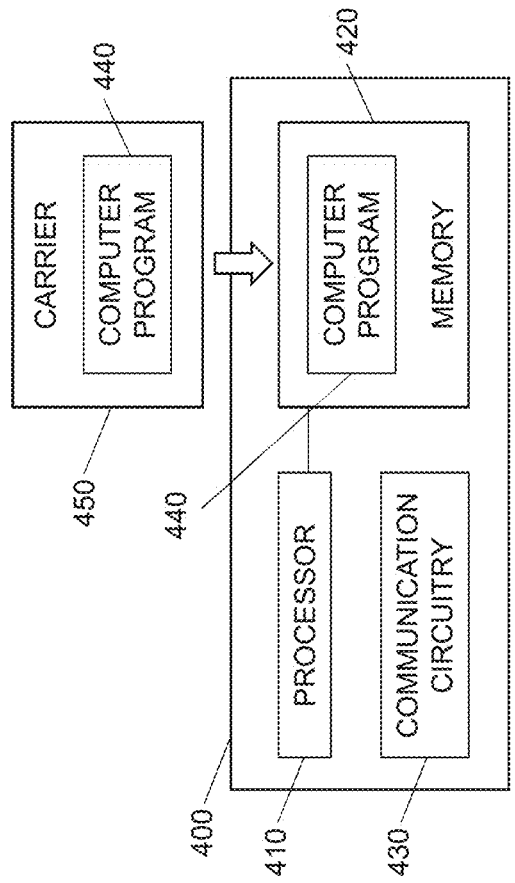
FIG. 26 schematically illustrates a computer program implementation according to an embodiment.

FIG. 26 is a schematic block diagram illustrating an example of a user equipment (UE) 400 comprising a processor 410, an associated memory 420 and a communication circuitry 430.

In this particular example, at least some of the steps, functions, procedures, modules and/or blocks described herein are implemented in a computer program 440, which is loaded into the memory 420 for execution by processing circuitry including one or more processors 410. The processor 410 and memory 420 are interconnected to each other to enable normal software execution. A communication circuitry 430 is also interconnected to the processor 410 and/or the memory 420 to enable input and/or output of a video bitstream and decoded pictures.

The user equipment 400 can be any device or apparatus that can receive and process a video bitstream. For instance, the user equipment 400 could be a computer, either stationary or portable, such as laptop, a smart phone, a tablet, a set-top box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 440 comprises instructions, which when executed by the processor 410, cause the processor 410 to obtain a DRAP picture that is encoded as a trailing picture that may be used for reference and constitutes a random access point in the video bitstream. The processor 410 is also caused to obtain an IRAP picture of the video bitstream. The processor 410 is further caused to decode the IRAP picture, and decode the DRAP picture using the IRAP picture as sole reference picture for the DRAP picture. The processor 410 is additionally caused to perform a random access operation at the decoded DRAP picture.

The proposed technology also provides a carrier 450 comprising the computer program 440. The carrier 450 is one of an electronic signal, an optical signal, an electromagnetic signal, a magnetic signal, an electric signal, a radio signal, a microwave signal, or a computer-readable storage medium 450.

By way of example, the software or computer program 440 may be realized as a computer program product, which is normally carried or stored on a computer-readable medium 440, preferably non-volatile computer-readable storage medium 450. The computer-readable medium 450 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 440 may thus be loaded into the operating memory of a computer or equivalent processing device, represented by the user equipment 400 in FIG. 26, for execution by the processor 410 thereof.

The flow diagram or diagrams presented herein may therefore be regarded as a computer flow diagram or diagrams, when performed by one or more processors. A corresponding user client may be defined as a group of function modules, where each step performed by the processor corresponds to a function module. In this case, the function modules are implemented as a computer program running on the processor. Hence, the user client may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 21.

Figure 21:
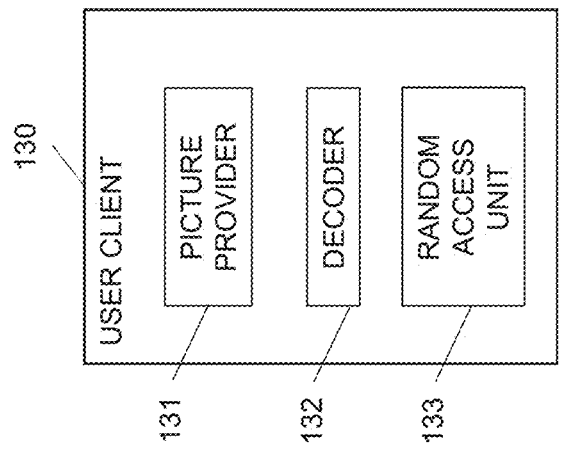
FIG. 21 is a schematic block diagram of a user client according to a further embodiment.

FIG. 21 is a schematic block diagram of a user client 130 with function modules. The user client 130 comprises a picture provider 131 for obtaining a DRAP picture and an IRAP picture. The DRAP picture is encoded as a trailing picture that may be used for reference and constitutes a random access point in the video bitstream. The user client 130 also comprises a decoder 132 for decoding the IRAP picture and decoding the DRAP picture using the IRAP picture as sole reference picture for the DRAP picture. The user client 130 further comprises a random access unit for performing a random access operation at the decoded DRAP picture.

A further aspect of the embodiments relates to a video communication server. The video communication server is configured to transmit a video bitstream comprising at least one IRAP picture on a communication channel to a user client. The video communication server is also configured to receive a feedback message on a feedback channel from the user client. The feedback message indicates a position within the video bitstream corresponding to a corrupt or missing picture at the user client. The video communication server is further configured to encode, based on the feedback message, a DRAP picture using a previous IRAP picture in the video bitstream as sole reference picture for the DRAP picture. The DRAP picture is encoded as a trailing picture that may be used for reference and constitutes a random access point in the video bitstream. The video communication server is additionally configured to transmit the DRAP picture to the user client.

In an embodiment, the video communication server is configured to transmit at least one non-RAP picture following the DRAP picture in output order and decoding order to the user client. The at least one non-RAP picture does not use any non-RAP picture preceding the DRAP picture in decoding order in the video bitstream as reference picture.

Figure 22:
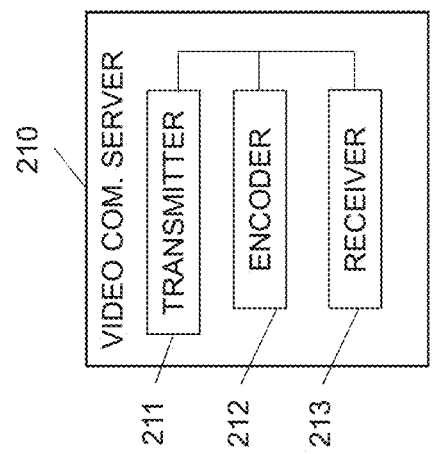
FIG. 22 is a schematic block diagram of a video communication server according to an embodiment.

FIG. 22 is an illustration of a hardware implementation of a video communication server 210 according to an embodiment. The video communication server 210 comprises a transmitter 211 configured to transmit the video bitstream and the DRAP picture to the user client. The video communication server 210 also comprises a receiver 213 configured to receive the feedback message on the feedback channel from the user client. The video communication server 210 further comprises an encoder 212 configured to encode the DRAP picture based on the feedback message.

The receiver 213 is preferably connected to the encoder 212 in order to forward the received feedback message or information contained therein to the encoder 212. The encoder 212 is preferably connected to the transmitter 211 in order to forward encoded pictures, including the encoded DRAP picture, to the transmitter 211 for transmission to the user client.

FIG. 22 has illustrated the video communication server 210 as comprising separate transmitter 211 and receiver 213. In an alternative implementation, a combined transceiver could be present in the video communication server 210 to manage both reception and transmission of data. The transmitter 211 and receiver 213, or transceiver, may be implemented for wireless transmission and reception. Alternatively, they may be implemented for wired transmission and reception.

Figure 23:
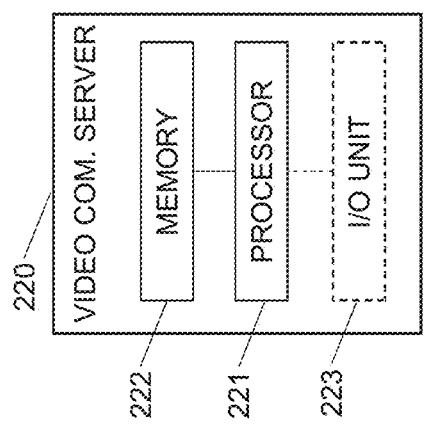
FIG. 23 is a schematic block diagram of a video communication server according to another embodiment.

FIG. 23 is an illustration of an implementation in software of the video communication server 220. In a particular example, the video communication server 220 comprises a processor 221 and a memory 222 comprising instructions executable by the processor 221. The processor 221 is operative to output the video bitstream and the DRAP picture for transmission to the user client. The processor 121 is also operative to encode the DRAP picture based on the received feedback message.

In an embodiment, the video communication server 220 also comprises an I/O unit 223 configured to transmit the video bitstream and DRAP picture to the user client and receive the feedback message from the user client. The I/O unit 223 could be implemented as a transceiver, a receiver and a transmitter or as an input port and an output port.

The memory 222 of the video communication server 220 preferably comprises the DPB used by the processor 221 in order to store and access reconstructed pictures during the encoding process.

In a particular embodiment, the processor 221 is operative, when executing the instructions stored in the memory 222 to perform the above described operations. The processor 221 is thereby interconnected to the memory 222 to enable normal software execution.

Figure 24:
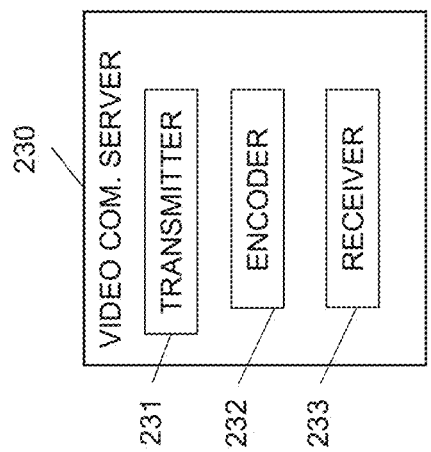
FIG. 24 is a schematic block diagram of a video communication server according to a further embodiment.

FIG. 24 is a schematic block diagram of a video communication server 230 with function modules. The video communication server 230 comprises a transmitter 231 for transmitting a video bitstream comprising at least one IRAP picture on a communication channel to a user client. The video communication server 230 also comprises a receiver 233 for receiving a feedback message on a feedback channel from the user client. The feedback message indicates a position within the video bitstream corresponding to a corrupt or missing picture at the user client. The video communication server further comprises an encoder 232 for encoding, based on the feedback message, a DRAP picture using a previous IRAP picture in the video bitstream as sole reference picture for the DRAP picture. The DRAP picture is encoded as a trailing picture that may be used for reference and constitutes a random access point in the video bitstream. The transmitter 231 of the video communication server 230 is further for transmitting the DRAP picture to the user client.

FIG. 26 represents, in an embodiment, a schematic block diagram illustrating an example of a video communication server 400 comprising a processor 410, an associated memory 420 and a communication circuitry 430. In this particular example, at least some of the steps, functions, procedures, modules and/or blocks described herein are implemented in a computer program 440, which is loaded into the memory 420 for execution by processing circuitry including one or more processors 410.

In an embodiment, the computer program 440 comprises instructions, which when executed by the processor 410, cause the processor 410 to transmit a video bitstream comprising at least one IRAP picture on a communication channel to a user client. The processor 410 is also caused to receive a feedback message on a feedback channel from the user client. The feedback message indicates a position within the video bitstream corresponding to a corrupt or missing picture at the user client. The processor 410 is further caused to encode, based on the feedback message, a DRAP picture using a previous IRAP picture in the video bitstream as sole reference picture for the DRAP picture. The DRAP picture is encoded as a trailing picture that may be used for reference and constitutes a random access point in the video bitstream. The processor 410 is additionally caused to transmit the DRAP picture to the user client.

A further aspect of the embodiments relates to an encoder for encoding a video stream of pictures into a video bitstream. The encoder is configured to encode every $n^{th}$ picture in the video stream as a RAP picture and encode the other pictures in the video stream as non-RAP pictures. The encoder is also configured to encode the every $n^{th}$ picture by encoding every $m^{th}$ RAP picture as an IRAP picture and encoding the other RAP pictures as DRAP pictures using a respective closest preceding, according to a decoding order, IRAP picture as sole reference picture for the DRAP picture. Each DRAP picture is encoded as a trailing picture and constitutes a random access point in the video bitstream.

Another aspect of the embodiments relates to an encoder for encoding a video stream of pictures into a video bitstream. The encoder is configured to encode every $n^{th}$ picture in the video stream as a RAP picture and encode the other pictures in the video stream as non-RAP pictures. The encoder is also configured to encode every $n^{th}$ picture by determining, for at least a subset of the RAP pictures, whether the RAP picture is to be encoded as an IRAP picture or a DRAP picture based on a bit-cost difference between encoding the RAP picture as an IRAP picture or as a DRAP picture. A DRAP picture is encoded by the encoder using a respective closest preceding, according to a decoding order, IRAP picture as sole reference picture for the DRAP picture. The DRAP picture is encoded as a trailing picture and constitutes a random access point in the video bitstream.

In an embodiment, the encoder is configured to encode the RAP picture as a DRAP picture if an estimated bit cost for encoding the RAP picture as a DRAP picture is lower than an estimated bit cost for encoding the RAP picture as an IRAP picture minus a threshold and otherwise encode the RAP picture as an IRAP picture.

In an embodiment, the encoder is configured to perform the determination whether the RAP picture is to be encoded as an IRAP picture or a DRAP picture only if encoding the RAP picture as a DRAP picture would not lead to a distance between two successive IRAP pictures in the video bitstream is larger than a maximum distance and otherwise encode the RAP picture as an IRAP picture.

Figure 25:
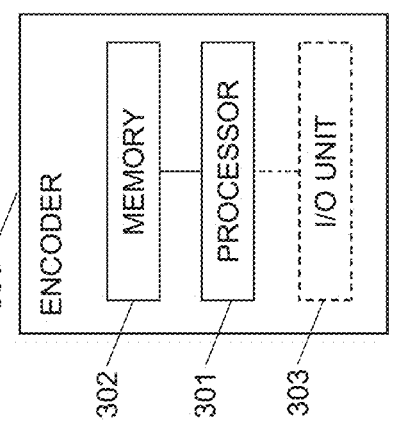
FIG. 25 is a schematic block diagram of an encoder according to an embodiment.

The encoder may be implemented in hardware or in software, or a combination thereof, including as functional modules. FIG. 25 is an illustration of an implementation in software of the encoder 300. In a particular example, the encoder 300 comprises a processor 301 and a memory 302 comprising instructions executable by the processor 301. The processor 301 is operative to encode every $n^{th}$ picture in the video stream as a RAP picture and encode the other pictures in the video stream as non-RAP pictures as described above.

In an embodiment, the encoder 300 also comprises an I/O unit 303 configured to output encoded pictures of the video bitstream. The I/O unit 303 is preferably also configured to receive pictures to be encoded. The I/O unit 303 could be implemented as a transceiver, a receiver and a transmitter or as an input port and an output port.

The memory 302 of the encoder 300 preferably comprises the DPB used by the processor 301 in order to store and access reconstructed pictures during the encoding process.

In a particular embodiment, the processor 301 is operative, when executing the instructions stored in the memory 302 to perform the above described operations. The processor 301 is thereby interconnected to the memory 302 to enable normal software execution.

FIG. 26 represents, in an embodiment, a schematic block diagram illustrating an example of an encoder 400 comprising a processor 410, an associated memory 420 and a communication circuitry 430. In this particular example, at least some of the steps, functions, procedures, modules and/or blocks described herein are implemented in a computer program 440, which is loaded into the memory 420 for execution by processing circuitry including one or more processors 410.

In an embodiment, the computer program 440 comprises instructions, which when executed by the processor 410, cause the processor 410 to encode every $n^{th}$ picture in the video stream as a RAP picture and encode the other pictures in the video stream as non-RAP pictures. The processor is also caused to encode the every $n^{th}$ picture by encoding every $m^{th}$ RAP picture as an IRAP picture and encoding the other RAP pictures as DRAP pictures using a respective closest preceding, according to a decoding order, IRAP picture as sole reference picture for the DRAP picture. Each DRAP picture is encoded as a trailing picture and constitutes a random access point in the video bitstream.

In another embodiment, the computer program 440 comprises instructions, which when executed by the processor 410, cause the processor 410 to encode every $n^{th}$ picture in the video stream as a RAP picture and encode the other pictures in the video stream as non-RAP pictures. The processor is also caused to encode every $n^{th}$ picture by determining, for at least a subset of the RAP pictures, whether the RAP picture is to be encoded as an IRAP picture or a DRAP picture based on a bit-cost difference between encoding the RAP picture as an IRAP picture or as a DRAP picture. A DRAP picture is encoded by the encoder using a respective closest preceding, according to a decoding order, IRAP picture as sole reference picture for the DRAP picture. The DRAP picture is encoded as a trailing picture and constitutes a random access point in the video bitstream.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for performing a random access operation in a video bitstream, comprising:
obtaining a first dependent random access point, DRAP picture, wherein said first DRAP picture is encoded as a trailing picture for use as a reference and constitutes a random access point in said video bitstream and is encoded to solely reference a preceding intra random access point, IRAP, picture of said video bitstream;
obtaining a second DRAP picture encoded as a trailing picture for use as a reference and constitutes a random access point in said video bitstream and is encoded to solely reference said preceding IRAP picture of said video bitstream, said first DRAP picture preceding said second DRAP picture in said video bitstream;
obtaining said preceding IRAP picture of said video bitstream;
decoding said preceding IRAP picture;
decoding at least one of said first DRAP picture using said preceding IRAP picture as sole reference picture for said first DRAP picture and said second DRAP picture using said preceding IRAP picture as sole reference picture for said second DRAP picture; and
performing a random access operation at one of said decoded first DRAP picture or said decoded second DRAP picture.

2. The method according to claim 1, wherein obtaining said first DRAP picture comprises identifying said first DRAP picture in said video bitstream at least partly based on a supplemental enhancement information, SEI, message associated with said first DRAP picture.

3. The method according to claim 1, wherein obtaining said preceding IRAP picture comprises identifying said preceding IRAP picture in a decoded picture buffer based on an identifier of said preceding IRAP picture present in a reference picture set of one of said first and second DRAP pictures.

4. The method according to claim 1, wherein obtaining said first DRAP picture and obtaining said preceding IRAP picture comprises:
downloading a segment of encoded video data of said video bitstream, said segment starting with said preceding IRAP picture and comprises at least one DRAP picture; and
identifying said first DRAP picture in said segment based on a jump forward or fast forward request.

5. The method according to claim 1, wherein obtaining said first DRAP picture and obtaining said preceding IRAP picture comprises:
downloading a first part of a segment of encoded video data of said video bitstream, said first part of said segment comprising said preceding IRAP picture and said segment is identified based on a jump forward request or a representation switch request;
downloading second part of said segment starting with said first DRAP picture identified based on said jump forward request or said representation switch request.

6. The method according to claim 1, wherein decoding said first DRAP picture comprises decoding said first DRAP picture using a closest preceding, according to said decoding order, IRAP picture in said video bitstream as said sole reference picture for said first DRAP picture.

7. The method according to claim 1, further comprising decoding at least one non-random access point, non-RAP, picture of said video bitstream following said first DRAP picture in output order and decoding order, said at least one non-RAP picture does not use any non-RAP picture preceding said first DRAP picture in decoding order in said video bitstream as reference picture.

8. The method according to claim 7, further comprising:
outputting said decoded first DRAP picture; and
outputting said at least one decoded non-RAP picture.

9. The method according to claim 8, further comprising receiving an output flag associated with said preceding IRAP picture indicating that said preceding IRAP picture should not be output.

10. The method according to claim 1, further comprising:
receiving and decoding a current video bitstream representing a current channel;
receiving said video bitstream representing another channel; and
temporarily storing a most recent IRAP picture of said video bitstream or a decoded version of said most recent IRAP picture in a memory, wherein obtaining said first DRAP picture and obtaining said preceding IRAP picture comprises:
retrieving said most recent IRAP picture or said decoded version of said most recent IRAP picture from said memory based on a channel switch request identifying said another channel; and
receiving said first DRAP picture as a next DRAP picture within said video bitstream following said channel switch request.

11. The method according to claim 1:
wherein obtaining said preceding IRAP picture comprises receiving a video bitstream comprising said IRAP picture on a communication channel; and
wherein obtaining said first DRAP picture comprises:
transmitting a feedback message on a feedback channel following detection of a corrupt or missing picture in said video bitstream, said feedback message indicating a position within said video bitstream corresponding to said corrupt or missing picture; and
receiving said first DRAP picture generated based on said feedback message.

12. A video communication method comprising:
transmitting a video bitstream comprising at least one intra random access point, IRAP, picture on a communication channel to a user client device;
receiving a feedback message on a feedback channel from said user client device, said feedback message indicating a position within said video bitstream corresponding to a corrupt or missing picture at said user client device;
encoding, based on said feedback message, a first dependent random access point, DRAP, picture using a previous IRAP picture in said video bitstream as sole reference picture for said first DRAP picture, said first DRAP picture is encoded as a trailing picture for use as a reference and constitutes a random access point in said video bitstream;
encoding, based on said feedback message, a second DRAP picture using said previous IRAP picture in said video bitstream as sole reference picture for said second DRAP picture, said second DRAP picture is encoded as a trailing picture for use as a reference and constitutes a random access point in said video bitstream; and transmitting said first and second DRAP pictures to said user client device, wherein said first DRAP pictures precedes said second DRAP picture in said video bitstream.

13. The method according to claim 12, further comprising transmitting at least one non-random access point, non-RAP, picture following said first DRAP picture in output order and decoding order to said user client, said at least one non-RAP picture does not use any non-RAP picture preceding said first DRAP picture in decoding order in said video bitstream as reference picture.

14. A user client device comprising:
a processor, when executing instructions stored in a memory of the user client device, is operative to:
obtain a first dependent random access point, DRAP, picture, said first DRAP picture is encoded as a trailing picture that may be used for reference and constitutes a random access point in said video bitstream;
obtain a second DRAP picture encoded as a trailing picture for use as a reference and constitutes a random access point in said video bitstream and is encoded to solely reference said preceding IRAP picture of said video bitstream, said first DRAP picture preceding said second DRAP picture in said video bitstream;
obtain said preceding IRAP picture of said video bitstream;
decode said IRAP picture;
decode at least one of said first DRAP picture using said preceding IRAP picture as sole reference picture for said first DRAP picture and said second DRAP picture using said preceding IRAP picture as sole reference picture for said second DRAP picture; and
perform a random access operation at one of said first decoded DRAP picture or said decoded second DRAP picture.

15. The user client device according to claim 14, wherein said processor further operates to identify said first DRAP picture in said video bitstream at least partly based on a supplemental enhancement information, SEI, message associated with said first DRAP picture.

16. The user client device according to claim 14, wherein said processor is further operative to identify said preceding IRAP picture in a decoded picture buffer based on an identifier of said preceding IRAP picture present in a reference picture set of said first DRAP picture.

17. The user client device according to claim 14, wherein said processor is further operative to:
download a segment of encoded video data of said video bitstream, said segment starting with said preceding IRAP picture and comprises at least one DRAP picture; and
identify said first DRAP picture in said segment based on a jump forward or fast forward request.

18. The user client device according to claim 14, wherein said processor is further operative to:
download a first part of a segment of encoded video data of said video bitstream, said first part of said segment comprising said preceding IRAP picture and said segment is identified based on a jump forward request or a representation switch request; and
download a second part of said segment starting with said first DRAP picture identified based on said jump forward request or said representation switch request.

19. The user client device according to claim 14, wherein said processor is further operative to decode said first DRAP picture using a closest preceding, according to said decoding order, IRAP picture in said video bitstream as said sole reference picture for said first DRAP picture.

20. The user client device according to claim 14, wherein said processor is further operative to decode at least one non-random access point, non-RAP, picture of said video bitstream following said first DRAP picture in output order and decoding order, said at least one non-RAP picture does not use any non-RAP picture preceding said first DRAP picture in decoding order in said video bitstream as reference picture.

21. The user client device according to claim 20, wherein said processor is further operative to:
output said decoded first DRAP picture; and
output said at least one decoded non-RAP picture.

22. The user client device according to claim 21, wherein said processor is further operative to receive an output flag associated with said preceding IRAP picture indicating that said IRAP picture should not be output.

23. The user client device according to claim 14, wherein said processor is further operative to:
receive and decode a current video bitstream representing a current channel;
receive said video bitstream representing another channel;
temporarily store a most recent IRAP picture of said video bitstream or a decoded version of said most recent IRAP picture in a memory;
retrieve said most recent IRAP picture or said decoded version of said most recent IRAP picture from said memory based on a channel switch request identifying said another channel; and
receive said first DRAP picture as a next DRAP picture within said video bitstream following said channel switch request.

24. The user client device according to claim 14, wherein said processor is further operative to:
receive a video bitstream comprising said preceding IRAP picture on a communication channel;
transmit a feedback message on a feedback channel following detection of a corrupt or missing picture in said video bitstream, said feedback message indicating a position within said video bitstream corresponding to said corrupt or missing picture; and
receive said first DRAP picture generated based on said feedback message.

25. A user client device comprising processing circuitry configured to:
obtain a first dependent random access point, DRAP picture, wherein said first DRAP picture is encoded as a trailing picture for use as a reference and constitutes a random access point in said video bitstream and is encoded to solely reference a preceding intra random access point, IRAP, picture of said video bitstream;
obtain second DRAP picture encoded as a trailing picture for use as a reference and constitutes a random access point in said video bitstream and is encoded to solely reference said preceding IRAP picture of said video bitstream, said first DRAP picture preceding said second DRAP picture in said video bitstream;
decode said preceding IRAP picture;
decode at least one of said first DRAP picture using said preceding IRAP picture as sole reference picture for said first DRAP picture and said second DRAP picture using said preceding IRAP picture as sole reference picture for said second DRAP picture; and perform a random access operation at one of said first decoded DRAP picture or said decoded second DRAP picture.

26. A video communication server, comprising:
a processor, when executing instructions stored in a memory of the video communication server, is operative to:
transmit a video bitstream comprising at least one intra random access point, IRAP, picture on a communication channel to a user client device;
receive a feedback message on a feedback channel from said user client device, said feedback message indicating a position within said video bitstream corresponding to a corrupt or missing picture at said user client device;
encode, based on said feedback message, a first dependent random access point, DRAP, picture using a previous IRAP picture in said video bitstream as sole reference picture for said first DRAP picture, said first DRAP picture is encoded as a trailing picture for use as a reference and constitutes a random access point in said video bitstream;
encode, based on said feedback message, a second DRAP picture using said previous IRAP picture in said video bitstream as sole reference picture for said second DRAP picture, said second DRAP picture is encoded as a trailing picture for use as a reference and constitutes a random access point in said video bitstream; and
transmit said first and second DRAP pictures to said user client device on the communication channel, wherein said first DRAP pictures precedes said second DRAP picture in said video bitstream.

27. The video communication server according to claim 26, wherein the processor is further operative to transmit at least one non-random access point, non-RAP, picture following said first DRAP picture in output order and decoding order to said user client device, said at least one non-RAP picture does not use any non-RAP picture preceding said first DRAP picture in decoding order in said video bitstream as reference picture.

28. A video communication server, comprising:
a transmitter that transmits a video bitstream comprising at least one intra random access point, TRAP, picture on a communication channel to a user client device;
a receiver that receives a feedback message on a feedback channel from said user client device, said feedback message indicating a position within said video bitstream corresponding to a corrupt or missing picture at said user client device; and
an encoder that encodes, based on said feedback message:
a first dependent random access point, DRAP, picture using a previous IRAP picture in said video bitstream as sole reference picture for said first DRAP picture, said DRAP picture is encoded as a trailing picture for use as a reference and constitutes a random access point in said video bitstream, wherein said transmitter also transmits said first DRAP picture to said user client device; and
a second dependent random access point, DRAP, picture using said previous IRAP picture in said video bitstream as sole reference picture for said second DRAP picture, said DRAP picture is encoded as a trailing picture for use as a reference and constitutes a random access point in said video bitstream, wherein said transmitter also transmits said second DRAP picture to said user client device, wherein said first DRAP pictures precedes said second DRAP picture in said video bitstream.

29. A computer program product comprising instructions stored on a non-transitory computer-readable medium, which when executed by a processor, causes said processor to:
obtain a first dependent random access point, DRAP picture, wherein said first DRAP picture is encoded as a trailing picture for use as a reference and constitutes a random access point in said video bitstream and is encoded to solely reference a preceding intra random access point, TRAP, picture of said video bitstream;
obtain second DRAP picture encoded as a trailing picture for use as a reference and constitutes a random access point in said video bitstream and is encoded to solely reference said preceding IRAP picture of said video bitstream, said first DRAP picture preceding said second DRAP picture in said video bitstream;
obtain said preceding IRAP picture of said video bitstream;
decode said preceding IRAP picture;
decode at least one of said first DRAP picture using said preceding IRAP picture as sole reference picture for said first DRAP picture and said second DRAP picture using said preceding IRAP picture as sole reference picture for said second DRAP picture; and
perform a random access operation at one of said first decoded DRAP picture or said decoded DRAP picture.

30. A computer program product comprising instructions stored on a non-transitory computer-readable medium, which when executed by a processor, cause said processor to:
transmit a video bitstream comprising at least one intra random access point, IRAP, picture on a communication channel to a user client device;
receive a feedback message on a feedback channel from said user client device, said feedback message indicating a position within said video bitstream corresponding to a corrupt or missing picture at said user client device;
encode, based on said feedback message, a first dependent random access point, DRAP, picture using a previous IRAP picture in said video bitstream as sole reference picture for said first DRAP picture, said first DRAP picture is encoded as a trailing picture for use as a reference and constitutes a random access point in said video bitstream;
encode, based on said feedback message, a second DRAP picture using said IRAP picture in said video bitstream as sole reference picture for said second DRAP picture, said second DRAP picture is encoded as a trailing picture for use as a reference and constitutes a random access point in said video bitstream; and
transmit said first and second DRAP picture to said user client device, wherein said first DRAP pictures precedes said second DRAP picture in said video bitstream.

31. A computer program comprising instructions stored on a non-transitory computer-readable medium, which when executed by a processor, cause said processor to:
encode every $n^{th}$ picture in said video stream as a random access point, RAP, picture and encode the other pictures in said video stream as non-RAP pictures, wherein said processor is caused to encode said every $n^{th}$ picture by encoding every $m^{th}$ RAP picture as an intra random access point, IRAP, picture and encoding the other RAP pictures as dependent random access point, DRAP, pictures using a respective closest preceding, according to a decoding order, IRAP picture as sole reference picture for said DRAP picture, each DRAP picture is encoded as a trailing picture and constitutes a random access point in said video bitstream.

32. The method according to claim 1, wherein decoding at least one of said first and second DRAP pictures comprises:
    decoding said first DRAP picture using said preceding IRAP picture as a sole reference picture for said first DRAP picture; and
    decoding said second DRAP picture using said preceding IRAP picture as sole reference picture for said second DRAP picture.

33. The method according to claim 1, wherein obtaining the IRAP picture comprises:
    calculating a picture order count (POC) value of said preceding IRAP picture based on a POC value of one of the first and second DRAP pictures and a reference picture delta identifier; and
    obtaining said preceding IRAP picture using the calculated POC value of the IRAP picture.

34. The method according to claim 33, wherein the reference picture delta identifier has a non-zero value.

35. The method according to claim 12, wherein the feedback message indicates the previous IRAP picture to encode one of the first and second DRAP pictures.

36. The user client device according to claim 14, wherein said processor is further operative to:
    decode said first DRAP picture using said preceding IRAP picture as a sole reference picture for said first DRAP picture; and
    decode said second DRAP picture using said preceding IRAP picture as sole reference picture for said second DRAP picture.

37. The user client device according to claim 14, wherein said processor is further operative to:
    calculate a picture order count (POC) value of said preceding IRAP picture based on a POC value of one of the first and second DRAP pictures and a reference picture delta identifier; and
    obtain said preceding IRAP picture using the calculated POC value of the IRAP picture.

38. The user client device according to claim 37, wherein the reference picture delta identifier has a non-zero value.

39. The video communication server according to claim 26, wherein the feedback message indicates the previous IRAP picture to encode one of the first and second DRAP pictures.

40. The method of claim 1, wherein said preceding IRAP picture is an associated IRAP picture of at least one of the first and second DRAP picture.

\* \* \* \* \*